US 7,111,008 B2

(12) United States Patent
Nomura et al.

(10) Patent No.: US 7,111,008 B2
(45) Date of Patent: Sep. 19, 2006

(54) KNOWLEDGE-BASED MANAGEMENT DIAGNOSTIC SYSTEM

(75) Inventors: Takahiko Nomura, Minato-ku (JP); Noboru Konno, Suginami-ku (JP)

(73) Assignee: Fuji Xerox Co., LTD, Tokyo (JP)

( * ) Notice: Subject to any disclaimer, the term of this patent is extended or adjusted under 35 U.S.C. 154(b) by 459 days.

(21) Appl. No.: 09/987,118

(22) Filed: Nov. 13, 2001

(65) Prior Publication Data

US 2002/0059188 A1 May 16, 2002

(30) Foreign Application Priority Data

Nov. 13, 2000 (JP) ............................. 2000-345309
Oct. 2, 2001 (JP) ............................. 2001-306073

(51) Int. Cl.
*G06F 17/30* (2006.01)
(52) U.S. Cl. .................. 707/101; 707/102; 707/103 Z; 707/104.1; 705/10; 705/11
(58) Field of Classification Search ................ 707/1–3, 707/102, 104.1, 101, 103 Z; 705/7–11; 702/185
See application file for complete search history.

(56) References Cited

U.S. PATENT DOCUMENTS

| 5,265,035 | A * | 11/1993 | Reifman et al. ............. 702/185 |
| 5,551,880 | A * | 9/1996 | Bonnstetter et al. ......... 434/236 |
| 5,909,669 | A * | 6/1999 | Havens .......................... 705/11 |
| 5,918,207 | A * | 6/1999 | McGovern et al. ............. 705/1 |
| 6,029,195 | A * | 2/2000 | Herz ........................... 725/116 |
| 6,070,143 | A * | 5/2000 | Barney et al. .................. 705/8 |
| 6,275,812 | B1 * | 8/2001 | Haq et al. ..................... 705/11 |
| 6,285,993 | B1 * | 9/2001 | Ferrell .......................... 706/45 |
| 6,327,590 | B1 * | 12/2001 | Chidlovskii et al. ........... 707/5 |
| 6,480,885 | B1 * | 11/2002 | Olivier ......................... 709/207 |
| 6,556,974 | B1 * | 4/2003 | D'Alessandro ............... 705/10 |
| 6,571,279 | B1 * | 5/2003 | Herz et al. ................... 709/217 |
| 6,574,621 | B1 * | 6/2003 | Lautzenheiser et al. ........ 707/4 |
| 6,584,471 | B1 * | 6/2003 | Maclin et al. ........... 707/104.1 |
| 6,606,615 | B1 * | 8/2003 | Jennings et al. ............... 706/45 |
| 6,976,002 | B1 * | 12/2005 | Ferguson et al. ............. 705/11 |
| 2002/0035506 | A1 * | 3/2002 | Loya ........................... 705/14 |

(Continued)

FOREIGN PATENT DOCUMENTS

JP          A 7-319970          12/1995

OTHER PUBLICATIONS

U.S. Appl. No. 60/217,158, filed Jul. 10, 2000.*

(Continued)

*Primary Examiner*—Thuy N. Pardo
(74) *Attorney, Agent, or Firm*—Oliff & Berridge, PLC

(57) ABSTRACT

The present invention provides a knowledge-based management diagnosis system which evaluates/diagnoses enterprise management and automatically generates a community for enhancing the enterprise management. A questionnaire on the awareness, and etc. of employees is conducted, whereupon on the basis of the questionnaire, the management situation of an organization is diagnosed, the course of improvement/reform is indicated, and a community of persons who are interested in particular knowledge or whose work styles are similar is automatically generated. Knowledge assets are classified into the characteristic of individual working manners, the characteristic of working manners in the organization, and a characteristic expressive of the sources of profits at present and in the future, to which the characteristic of knowledge-based management may well be added. A correlation analysis is made using these characteristics, and evaluation/generation evaluates analytical results based on the correlation analysis or generates the community from the analytical results.

16 Claims, 10 Drawing Sheets

U.S. PATENT DOCUMENTS

2002/0065709 A1* 5/2002 MacKenzie .................. 705/10
2002/0091558 A1* 7/2002 Anderson et al. .............. 705/9
2003/0004778 A1* 1/2003 Gareau et al. ................ 705/10
2003/0061141 A1* 3/2003 D'Alessandro .............. 705/36

OTHER PUBLICATIONS

Klenke et al. "Predictors of Leadership Style, Organizational Commitment and Turnover of Information Systems Professionals." Procs. of the 1992 ACM SIGCPR Conference on Computer Personnel Research. pp. 171-183. May 1992. ACM Press.*

Etienne C. Wenger et al., "Communities of Practice: The Organizational Frontier", Harvard Business Review, pp. 139-145, Jan.-Feb. 2000.

Dr. Francis Duffy, "The New Office", Antique Collectors' Club, Ltd., pp. 60-67.

"Management of Knowledge Assets", pp. 84-97.

\* cited by examiner

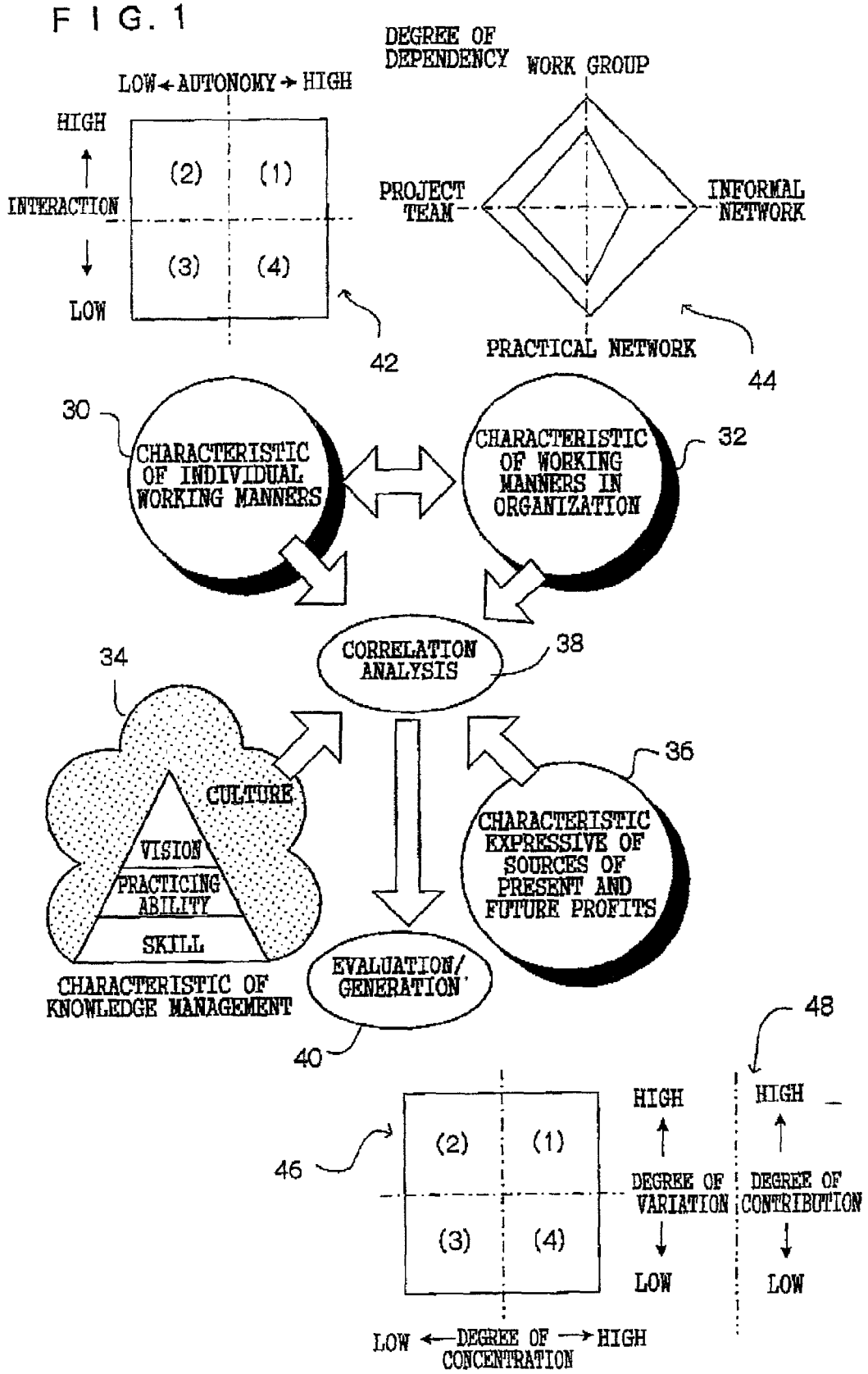

F I G. 1 0
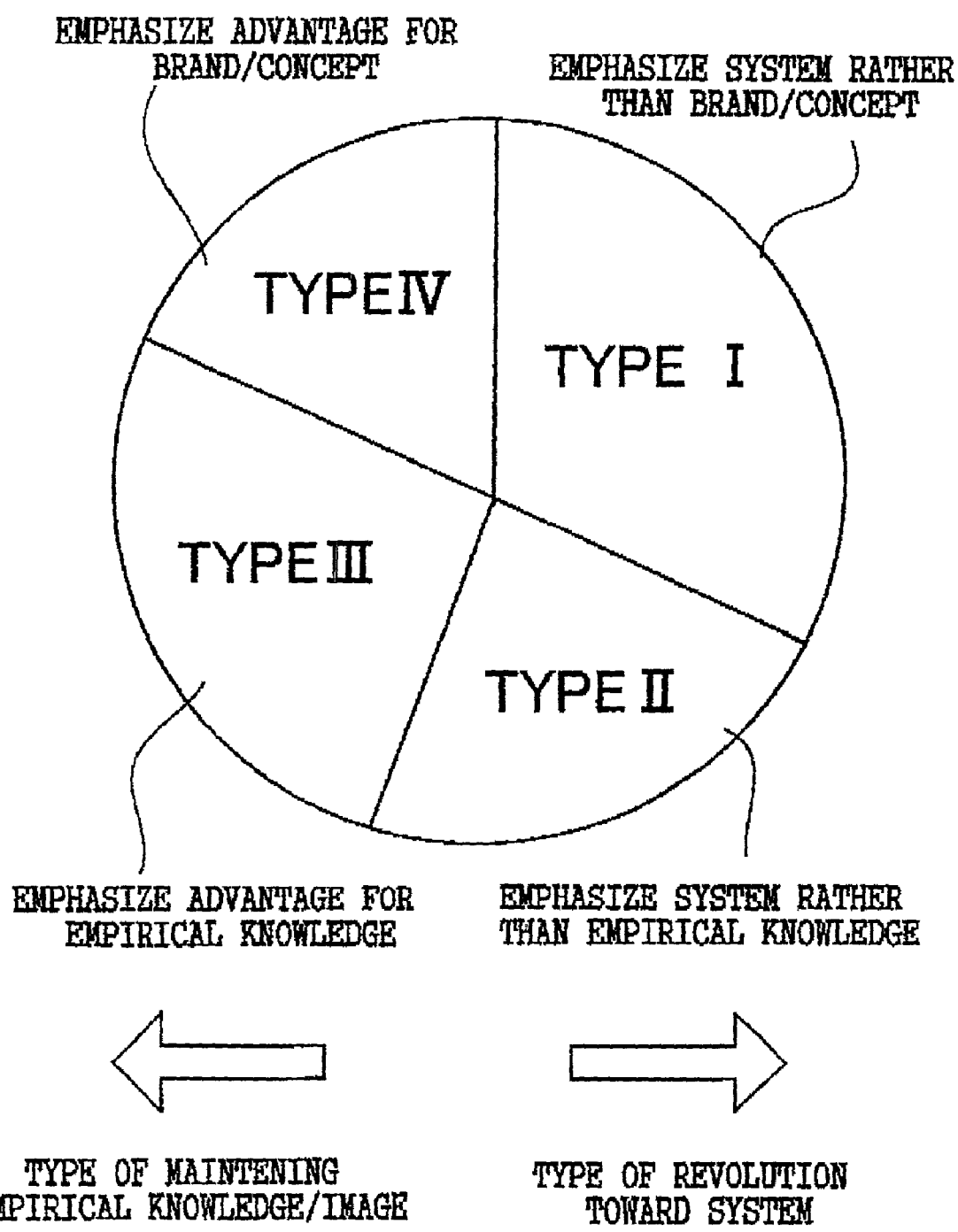

KNOWLEDGE-BASED MANAGEMENT DIAGNOSTIC SYSTEM

BACKGROUND OF THE INVENTION

1. Field of the Invention

The present invention relates to a knowledge-based management diagnostic method, apparatus and storage medium, and more particularly to a knowledge-based management diagnostic method, apparatus and storage medium which present the characteristics of an organization as various types of information in diagnosing its knowledge-based management.

2. Description of the Related Art

It is not easy to convey or make understood one's knowledge or style. More specifically, it is generally difficult to express exactly the thought or idea of each person or to convey it exactly to a third party, and one needs to empirically accumulate know-how in order to understand another's thoughts or ideas. Especially in an organization where individuals are expected to operate in groups, it is required from the viewpoint of knowledge-based management to grasp the abilities and features of each individual or to collectively group individuals who have abilities and features serving a particular purpose.

Various approaches for determining the features of organizations from the viewpoint of knowledge possessed by individuals have hitherto been suggested. For example, there are various methods wherein a questionnaire is distributed among employees or among the management of an enterprise so as to ascertain averages and deviations. In order to automatically perform organization design, there has been suggested an automatic organization design system wherein the knowledge of persons skilled or experienced in designing organizations is stored as a database, and wherein the organization design conforming to a situation is automatically performed by employing the database (see Japanese Patent Application (JPA) Laid-Open No. 07-319970). This technique discloses a database system for easily designing an organizational structure on the basis of accumulated know-how.

Knowledge-based management existing method for measuring the features of an organization from the viewpoint of knowledge is chiefly aimed at understanding the "status quo" of the organization, and does not consider the temporally changing aspects of the organization. An organization is expected to fluctuate at all times, and is sometimes motivated to actively change. Therefore, it is insufficient to merely consider the knowledge aspects of an organization in order to diagnose its knowledge-based management.

The importance of informal communities, as well as formal organizational structure, has come to be recognized as a circulation platform for information or knowledge in an organization (refer to Etienne Wenger, William Snyder: Communities of Practice: The Organizational Frontier, Harvard Business Review, January-February, 2000). No technique has taken into consideration the viewpoint of discovering or building such an informal community, or to effectively utilize such community in enterprise management.

SUMMARY OF THE INVENTION

In view of the above facts, the present invention provides a knowledge-based management diagnosis method, apparatus and storage medium which enable enhancement of knowledge abilities according to organizational tendencies.

The present invention evaluates/diagnoses enterprise management from the viewpoint of creating/utilizing knowledge, and automatically generates a community to enhance enterprise management. The "community" represents a place for information circulation or an information community itself. For example, based upon a questionnaire about the awareness and/or working manners of subjects such as individual employees, the management status of an organization is diagnosed, the course of improvement/reform is indicated, and a community of individuals interested in particular knowledge or whose work styles are similar, is automatically generated, whereby the intellectual productivity and creativeness of the organization are enhanced.

Existing methods for investigating the features of an organization from the knowledge viewpoint are merely aimed at grasping the "status quo" of the organization and does not provide any practicable methods for enhancing knowledge abilities based upon the results of the survey, whereas the present invention automatically generates a community serving as a platform for knowledge circulation based upon knowledge and working manners within an organization, whereby knowledge abilities are enhanced according to the tendencies of the organization.

A first aspect of the present invention diagnoses knowledge-based management by collecting data from a plurality of subjects in an organization, information on the organization is presented through a communication link, characterized by collecting awareness data from the respective subjects and accumulating them beforehand, the awareness data expressing at least knowledge assets and feature assets about actions; and analyzing the accumulated awareness data, and outputting results of the analysis toward a presentation side terminal through the communication link.

In the present invention, data on a plurality of subjects in a predetermined organization are collected. The data are awareness data expressing at least knowledge assets and feature assets about actions that are collected beforehand from the respective subjects and accumulated. The accumulated awareness data are analyzed, and the results of the analysis are output toward a presentation side terminal through a communication link, thereby to present information on the organization. The information may also represent a diagnosis of the organization's knowledge-based management. Accordingly, the relations between the knowledge assets of the organization or the subjects and the feature assets concerning the actions of the organization or the subjects are analyzed and presented, therefore preventing analytical results of high versatility not limited only to knowledge can be derived.

The knowledge-based management diagnosis method is characterized in that the knowledge assets are temporal knowledge assets in the case where the respective subjects contribute to the organization.

Knowledge assets sometimes fluctuate in their contents or forms with time. That is, the construction of an organization changes depending upon whether subjects contribute at present or are predicted to contribute in the future. Therefore, a temporal difference, for example, the enhancement or maintenance or the degradation of the degree of contribution from the present into the future can be offered as information on the organization by employing temporal knowledge assets in the case where the respective subjects contribute to the organization. For example, the organization can be classified based upon accumulated awareness data on knowledge assets important for the organization, in other words, by setting the criteria of knowledge domains which are important for the organization at present and knowledge domains which are to become important for the organization in the future. The organization can be further classified into, for example, a "status quo" reinforcement type and a revolutionary type, by grasping knowledge domains in which the subjects contribute to the construction of the organization, based upon whether the tendencies of the contributions to the knowledge domains are at present or in the future.

The knowledge-based management diagnosis method is characterized in that knowledge-based management assets concerning the knowledge-based management are further collected from the respective subjects and accumulated as the knowledge assets.

An analysis from the viewpoint of knowledge-based management is possible by taking into consideration such requirements as vision, practicing ability, technology, culture and the like, and by considering if the requirements are fulfilled.

The knowledge-based management diagnosis method is characterized in that the feature assets express information about the work styles of each subject.

The feature asset deals with actions and can be grasped as work styles of each subject.

The knowledge-based management diagnosis method is characterized in that the information about the work style of a subject include at least one status of autonomy, cooperation with other subjects concerned, or location where the subject work.

Each subject has a style in dealing with the work. The work styles of each individual can be classified by independence, the range of action, etc. concerning the manner of a daily work, such as the degrees of autonomy and interaction, and the location where the subject works. The knowledge-based management diagnosis method is characterized in that the information about the work style of a subject includes how the subject interrelates to other subjects.

In acquiring necessary knowledge, the cooperation of a third party is obtained or data on a network is utilized in many cases. Therefore, feature assets can be better classified by also taking into account one's dependency on a human network, such as work groups or project teams.

The knowledge-based management diagnosis method is characterized in that, in case of analyzing the accumulated awareness data, a correlation between the awareness data of the knowledge assets and the feature assets is analyzed.

In this manner, the accumulated awareness data are analyzed by finding the correlation between the awareness data of the knowledge assets and the feature assets. For example, if a strategy concerning the knowledge assets is aimed towards a revolutionary type, the work style exemplifying the feature asset must be intense in both autonomy and outward orientation. As a result of the analysis, the difference or tendency of such a relation can be easily derived.

The knowledge-based management diagnosis method is characterized in that, in case of analyzing the accumulated awareness data, a correlation between the awareness data of the knowledge assets and the feature assets expressing a status of one's interrelation to other subjects is analyzed.

In this manner, the accumulated awareness data are analyzed by finding the correlation between the awareness data of the knowledge assets and the feature assets expressing the status of one's interrelation to other subjects. For example, if a knowledge asset strategy is aimed towards a revolutionary type, a human network exemplifying the feature asset must be intense in the degree of dependency on a community of practice. As a result of the analysis, the difference or tendency of such a relation can be easily derived.

The knowledge-based management diagnosis method is characterized in that, in case of analyzing the accumulated awareness data, a correlation between the awareness data of the knowledge assets and the knowledge-based management assets is analyzed.

In this manner, the accumulated awareness data are analyzed by finding the correlation between the awareness data of the knowledge assets and the knowledge-based management assets. As a result of the analysis, one can judge, for example, if enhancement in the degree of knowledge asset management and the shift of the knowledge assets into an ideal form is proportional.

The knowledge-based management diagnosis method is characterized in that, in case of analyzing the accumulated awareness data, a correlation between the awareness data of the knowledge-based management assets and the feature assets is analyzed.

In this manner, the accumulated awareness data are analyzed by finding the correlation between the awareness data as of the knowledge-based management assets and the feature assets. As a result of the analysis, one can judge, for example, if enhancement in the degree of knowledge asset management and the shift of work styles into an ideal form is proportional.

The knowledge-based management diagnosis method is characterized in that, in case of analyzing the accumulated awareness data, a correlation between the awareness data of the knowledge-based management assets and the feature assets expressing a status of one's interrelation to other subjects concerned.

In this manner, the accumulated awareness data are analyzed by finding the correlation between the awareness data of the knowledge-based management assets and the feature assets expressing a status of one's interrelation to other subjects. As a result of the analysis, one can judge, for example, if enhancement of knowledge asset management and the shift of a human network into an ideal form are proportional.

The knowledge-based management diagnosis method is characterized in that, based upon the analytical results, the subjects who possess at leas one of the predetermined knowledge assets and the feature assets are grouped, whereupon an information community which expresses the subject group is built.

In an organization, an administrative person or the like may want to collect subjects who possess an intended knowledge asset. Therefore, at least either of the knowledge assets and the feature assets is input as intended assets beforehand, the subjects who possess the intended assets are grouped, and an information community which expresses the subject group is further built, whereby the administrative person or the like can easily collect the subjects possessing the intended knowledge assets.

The knowledge-based management diagnosis method is characterized in that, based upon the analytical results, the subjects in the organization are grouped, whereupon information communities which express the subject groups are built.

When an organization is surveyed or analyzed, subjects sometimes show certain tendencies. Therefore, communities which express subject groups according to the tendencies that cannot be expressed by existing organizational structure can be easily built. The communities include an information list expressing the subjects who intend to share the information by a mailing list or the like.

The knowledge-based management diagnosis method is characterized in that a predetermined set of organizations are selected, the analysis are made for the respective organizations, and that results of comparisons between the organizations are further included in the analytical results.

In this way, the differences among the organizations or the gap between the organizations and an ideal organization can be grasped, in order to aid the organizations shift into an ideal form.

The organizations are not restricted to organizations within the same enterprise. They may be in a plurality of organizational forms, and they may well be the organizations of other companies of the same trade or those of a plurality of different enterprises. In this case, standard analytical results are obtained as to the plurality of organizations, and the analytical results of the respective organizations relative to the standard analytical results are obtained, whereby the results of the comparisons among the organizations can be found.

In this way, when the plurality of organizations of the same trade have been determined, the tendencies of the determined organizations of the same trade can be found as the analytical results.

The awareness data can be collected and accumulated by a server beforehand.

When accumulating the awareness data, the awareness data, which express the knowledge assets and the feature assets about actions, are collected beforehand. In collecting the data, they may well be collected from the subjects through a communication link or by direct inputting. By collecting the data by a server, they can be uniformly collected.

The awareness data can be weighted by each the subject.

The awareness data are often understood differently by the subjects. More specifically, the awareness data which express the knowledge assets and the feature assets concerning actions are the individual data of the respective subjects, and the subjects sometimes suppose weights on importance, simplicity or the like for the respective awareness data. Therefore, the individual awareness data can be more accurately accumulated by collecting the awareness data that are weighted by the subjects.

It is possible to group the subjects beforehand, and to collect the awareness data by the groups The subjects often hold different positions within the organization. Therefore, the subjects are grouped beforehand, and the awareness data are collected by each group to provide analytical results of high versatility to view the organization in smaller groups or from opposite directions.

The knowledge-based management diagnosis method can be implemented by a knowledge-based management diagnosis apparatus. The knowledge-based management diagnosis apparatus wherein when knowledge-based management is diagnosed by collecting data on a plurality of subjects in a predetermined organization, information on the organization is presented through a communication link, comprises an accumulation component which collects awareness data from the respective subjects and accumulates them beforehand, the awareness data expressing at least knowledge assets and feature assets about actions; and a presentation component which analyzes the accumulated awareness data and outputs results of the analysis toward a presentation side terminal through the communication link, thereby to present the information on the organization.

A knowledge-based management diagnosis program which executes a process for diagnosing knowledge-based management can be possessed, conveyed, and installed in a computer by a storage medium described below, in which the knowledge-based management diagnosis program is stored. In detail, the storage medium which stores therein a knowledge-based management diagnosis program for presenting information on a predetermined organization, through a communication link when knowledge-based management is diagnosed by collecting data on a plurality of subjects in the organization; the knowledge-based management diagnosis program collecting awareness data from the respective subjects and accumulating them, the awareness data expressing at least knowledge assets and feature assets about actions, and analyzing the accumulated awareness data and outputting results of the analysis toward a presentation side terminal through the communication link, thereby to present the information on the organization.

A knowledge-based management second aspect of the present invention displays a plurality of knowledge items which include at least an item on empirical knowledge and an item on standardized knowledge; accumulating as first awareness data the knowledge items input from a plurality of subjects as being presently important for an organization to which the subjects belong, so as to calculate the number of the inputs every knowledge item, and also accumulating as second awareness data type the knowledge items input from the plurality of subjects as becoming important for the organization in the future, so as to calculate the number of the inputs every knowledge item; and comparing results calculated for the first awareness data and results calculated for the second awareness data, and displaying results of the comparisons in association with the respective knowledge items.

The knowledge-based management diagnosis method in the second aspect of the present invention is characterized in that a subject who is a member of the management input the knowledge items being presently important for the organization to which the subjects belong, and the knowledge items to become important in the future, and that results of the inputs are displayed together with the results of the comparisons.

The knowledge-based management diagnosis method in the second aspect of the present invention can be realized by a knowledge-based management diagnosis apparatus described below. The knowledge-based management diagnosis apparatus wherein when knowledge-based management is diagnosed by collecting data on a plurality of subjects, results of the diagnosis are presented through a communication link, is characterized by comprising an output component which outputs display information for displaying a plurality of knowledge items which include at least an item on empirical knowledge and an item on standardized knowledge; a calculation component which accumulates as first awareness data the knowledge items input from the plurality of subjects in correspondence with the display of the knowledge items, as being presently important for an organization to which the subjects belong, so as to calculate the number of the inputs every knowledge item, and which also accumulates as second awareness data the knowledge items input from the plurality of subjects as becoming important for the organization in the future, so as to calculate the number of the inputs every knowledge item; and a presentation component which compares results calculated for the first awareness data and results calculated for the second awareness data, and which displays results of the comparisons in association with the respective knowledge items.

A knowledge-based management diagnosis program which executes a process for diagnosing knowledge-based management can be possessed, conveyed, and installed in a computer by a storage medium described below, in which the knowledge-based management diagnosis program is stored. The storage medium which stores therein a knowledge-based management diagnosis program for presenting results of a diagnosis through a communication link when knowledge-based management is diagnosed by collecting data on a plurality of subjects; the knowledge-based management diagnosis program being characterized by outputting display information for displaying a plurality of knowledge items which include at least an item on empirical knowledge and an item on standardized knowledge; accumulating as first awareness data the knowledge items input from the plurality of subjects in correspondence with the display of the knowledge items, as being presently important for an organization to which the subjects belong, so as to calculate the number of the inputs every knowledge item, and also accumulating as second awareness data the knowledge items input from the plurality of subjects as becoming important for the organization in the future, so as to calculate the number of the inputs every knowledge item; and comparing results calculated for the first awareness data and results calculated for the second awareness data, and displaying results of the comparisons in association with the respective knowledge items.

Furthermore, a third aspect of the present invention is characterized by displaying a plurality of knowledge items which include at least an item on empirical knowledge and an item on standardized knowledge; accumulating as first awareness data the knowledge items input from a plurality of subjects as being presently important for an organization to which the subjects belong, so as to calculate the number of the inputs every knowledge item, and also accumulating as second awareness data the knowledge items input from the plurality of subjects as becoming important for the organization in the future, so as to calculate the number of the inputs every knowledge item; accumulating as third awareness data, information on degrees of contribution of the subjects themselves in the plurality of knowledge items as input from the plurality of subjects; and specifying the subjects who have input the data on the degrees of contribution, in any selected knowledge item.

The knowledge-based management diagnosis method in the third aspect of the present invention is characterized in that work styles which concern autonomy for works, interaction with persons concerned in the works, places where the subjects deal with the works, etc. and which are stored as to the specified subjects beforehand, are compared with ideal work styles which are stored beforehand, and that differences between both the work styles are presented.

The knowledge-based management diagnosis method in the third aspect of the present invention can be realized by a knowledge-based management diagnosis apparatus described below. The knowledge-based management diagnosis apparatus wherein when knowledge-based management is diagnosed by collecting data on a plurality of subjects, results of the diagnosis are presented through a communication link, is characterized by comprising an output component which outputs display information for displaying a plurality of knowledge items which include at least an item on empirical knowledge and an item on standardized knowledge; a calculation component which accumulates as first awareness data the knowledge items input from the plurality of subjects as being presently important for an organization to which the subjects belong, so as to calculate the number of the inputs every knowledge item, and which also accumulates as second awareness data the knowledge items input from the plurality of subjects as becoming important for the organization in the future, so as to calculate the number of the inputs every knowledge item; an accumulation component which accumulates as third awareness data, information on degrees of contribution of the subjects themselves in the plurality of knowledge items as input from the plurality of subjects; and a specification component which specifies the subjects who have input the data on the degrees of contribution, in any selected knowledge item.

A knowledge-based management diagnosis program which executes a process for diagnosing knowledge-based management can be possessed, conveyed, and installed in a computer by a storage medium described below, in which the knowledge-based management diagnosis program is stored. The storage medium which stores therein a knowledge-based management diagnosis program for presenting results of a diagnosis through a communication link when knowledge-based management is diagnosed by collecting data on a plurality of subjects; the knowledge-based management diagnosis program being characterized by outputting display information for displaying a plurality of knowledge items which include at least an item on empirical knowledge and an item on standardized knowledge; accumulating as first awareness data the knowledge items input from the plurality of subjects as being presently important for an organization to which the subjects belong, so as to calculate the number of the inputs every knowledge item, and also accumulating as second awareness data the knowledge items input from the plurality of subjects as becoming important for the organization in the future, so as to calculate the number of the inputs every knowledge item, accumulating as third awareness data, information on degrees of contribution of the subjects themselves in the plurality of knowledge items as input from the plurality of subjects; and specifying the subjects who have input the data on the degrees of contribution, in any selected knowledge item.

A knowledge-based management diagnosis method in a fourth aspect of the present invention is characterized by displaying a plurality of knowledge items which include at least an item on empirical knowledge and an item on standardized knowledge; accumulating as first awareness data the knowledge items input from a plurality of subjects as being presently important for an organization to which the subjects belong, so as to calculate the number of the inputs every knowledge item, and also accumulating as second awareness data the knowledge items input from the plurality of subjects as becoming important for the organization in the future, so as to calculate the number of the inputs every knowledge item; and comparing results calculated for the first awareness data and results calculated for the second awareness data, classifying the organization into a plurality of categories based upon results of the comparisons, and outputting the classified categories.

The knowledge-based management diagnosis method in the fourth aspect of the present invention can be easily realized by a knowledge-based management diagnosis apparatus described below. In detail, the knowledge-based management diagnosis apparatus wherein when knowledge-based management is diagnosed by collecting data on a plurality of subjects, results of the diagnosis are presented through a communication link, is characterized by comprising an output component which outputs display information for displaying a plurality of knowledge items which include at least an item on empirical knowledge and an item on standardized knowledge; a calculation component which accumulates as first awareness data the knowledge items input from the plurality of subjects as being presently important for an organization to which the subjects belong, so as to calculate the number of the inputs every knowledge item, and which also accumulates as second awareness data the knowledge items input from the plurality of subjects as becoming important for the organization in the future, so as to calculate the number of the inputs every knowledge item; and a classified category output component which compares results calculated for the first awareness data and results calculated for the second awareness data, classifies the organization into a plurality of categories based upon results of the comparisons, and outputs the classified categories.

A knowledge-based management diagnosis program which executes a process for diagnosing knowledge-based management can be possessed, conveyed, and installed in a computer by a storage medium described below, in which the knowledge-based management diagnosis program is stored. The storage medium which stores therein a knowledge-based management diagnosis program for presenting results of a diagnosis through a communication link when knowledge-based management is diagnosed by collecting data on a plurality of subjects; the knowledge-based management diagnosis program being characterized by outputting display information for displaying a plurality of knowledge items which include at least an item on empirical knowledge and an item on standardized knowledge; accumulating as first awareness data the knowledge items input from the plurality of subjects as being presently important for an organization to which the subjects belong, so as to calculate the number of the inputs every knowledge item, and also accumulating as second awareness data the knowledge items input from the plurality of subjects as becoming important for the organization in the future, so as to calculate the number of the inputs every knowledge item; and comparing results calculated for the first awareness data and results calculated for the second awareness data, classifying the organization into a plurality of categories based upon results of the comparisons, and outputting the classified categories.

The present invention brings forth the effects that the relations between the knowledge assets of an organization or subjects and the feature assets concerning the actions of the organization or subjects can be analyzed and presented, and that analytical results of high versatility as are not limited only to knowledge can be derived.

BRIEF DESCRIPTION OF THE DRAWINGS

FIG. 1 is a diagram of images conceptually showing the handling and flow of information for aiding in knowledge-based management in a network system according to preferred embodiment of the present invention;

FIG. 10 is a diagram of images showing a result obtained by the correlation analysis of awareness data.

DESCRIPTION OF THE PREFERRED EMBODIMENTS

Now, a preferred embodiment of the present invention will be described in detail with reference to the drawings. In this embodiment, the present invention is applied to a case where knowledge assets are totalized and analyzed regarding organizational subjects, such as employees, through communication via the Internet or the like, so as to aid in enhancement of creativity based on the knowledge assets, or utilization thereof. This embodiment is especially suited for application to a system that automatically generates a community that carries out enterprise management. In other words, to an automatic community generation system which surveys knowledge assets and works for promoting knowledge-based management and which presents the results of the surveys or finds correlations among respective surveys, thereby to aid knowledge-based management of the enterprise.

Figure 2:
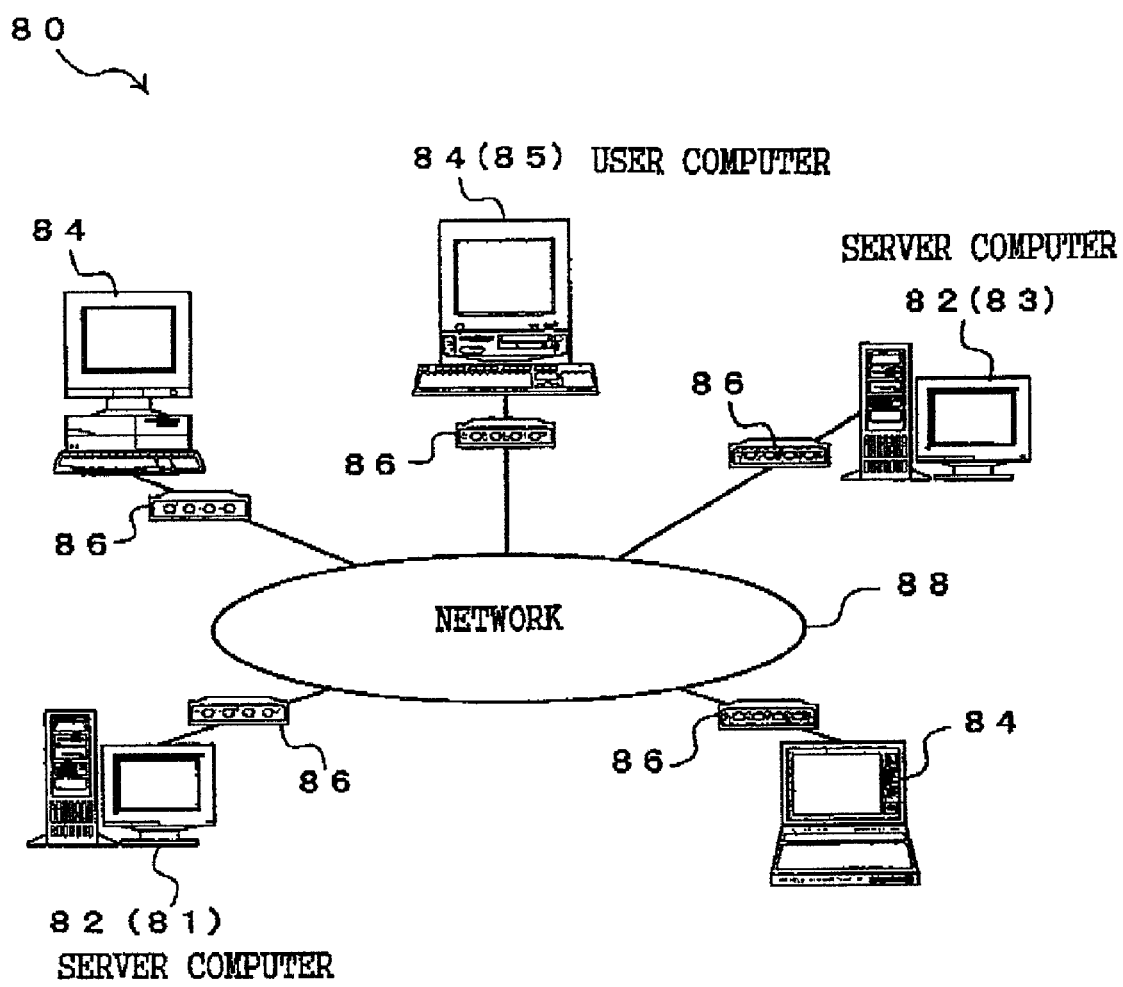
FIG. 2 is an architectural diagram showing the concept of the network system according to the embodiment of the present invention.

Shown in FIG. 2 is the schematic architecture of a network system to which the present invention is applicable. As shown in the figure, the network system 80 is so constructed that a plurality of computers 82 for an organization, each being operated by a single subject or a plurality of subjects, and a plurality of computers 84 for an identical entity or different entities are connected to a network (for example, the Internet) 88 through connection devices 86 such as modems, routers or TAs (terminal adapters). The computers 82, 84 are capable of exchanging information by two-way communications through the network 88.

Figure 3:
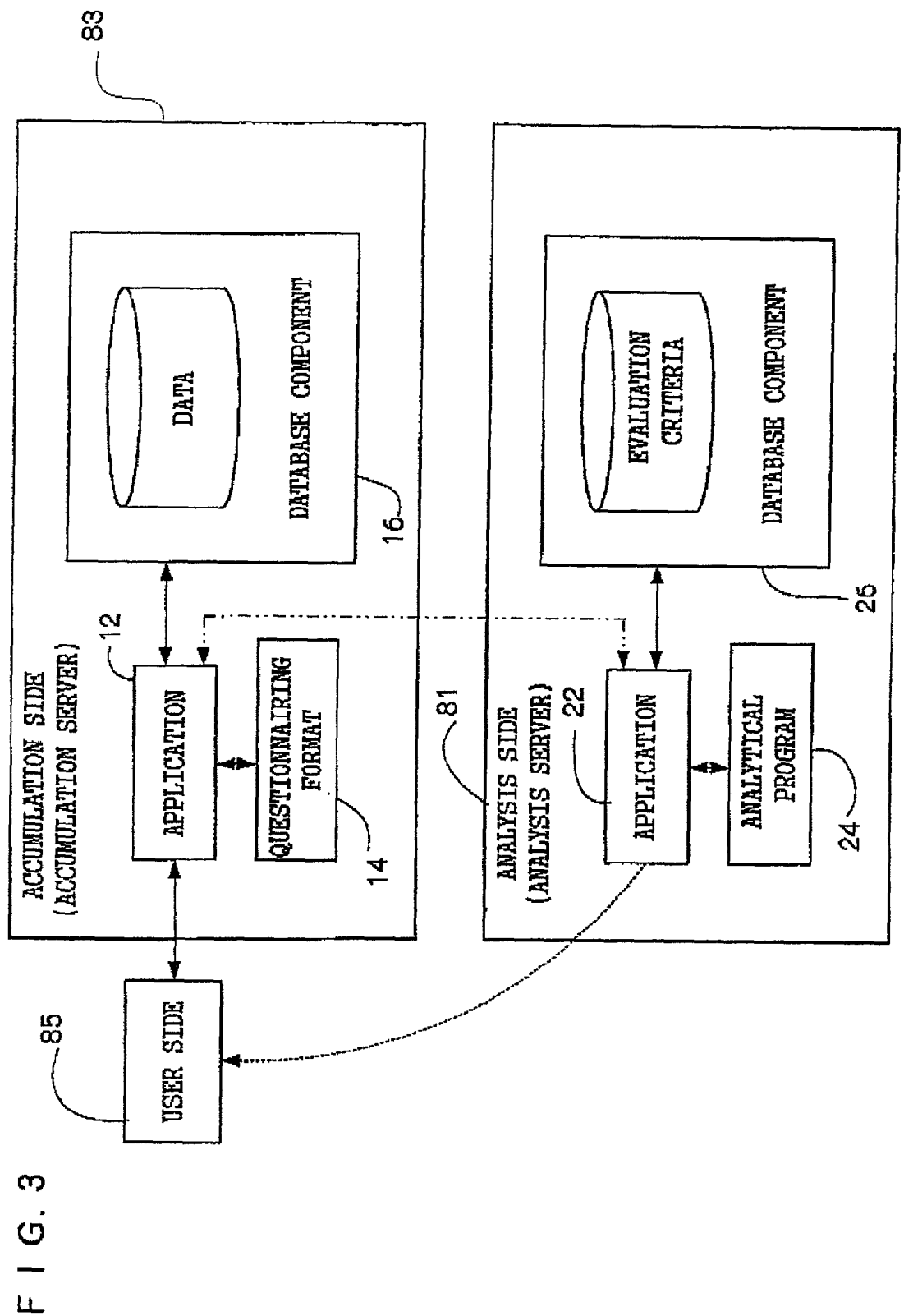
FIG. 3 is a block diagram functionally showing the exchanges of information by computers in the network system according to the embodiment of the present invention.

In the following description, there will be exemplified an architecture wherein, as shown in FIG. 2, at least one of the plurality of computers 82 is a computer (hereinafter, termed "server computer") which surveys or analyzes knowledge assets, while the computers 84 function as computers for users 6(hereinafter, termed "user computers") 85, as shown in FIG. 3, which reply to, e. g., a questionnaire in the case of investigating the knowledge assets of the subjects or receives data for aiding creation based on knowledge assets or utilization thereof. Among the computers functioning as the server computers 82, the server computer 82 for accumulating awareness data which expresses the knowledge assets of the subjects in various viewpoints, functions as an accumulation server 83, and the server computer 82 for analyzing the survey results of the knowledge assets, functions as an analysis server 81. These computers may be implemented either by a single server or by a plurality of servers for distributed processing.

In the present invention, the user computer 85 corresponds to a "presentation side terminal". In addition, the network 88 corresponds to a "communication link" in the present invention.

In this embodiment, the application of the Internet as the network will be explained. In this case, at least one computer can function as a WWW (World Wide Web) server, and the other machines can function also as WWW clients.

More specifically, a WWW browser is installed in each user computer 85, and the server computers 82 (analysis server 81, accumulation server 83) can be freely accessed through the network 88 by starting the WWW browser. On this occasion, an access position (data formed by the position of the server computer 82 being an access destination, and the position of information in the server computer 82) is designated by a URL (Uniform Resource Locator).

In a case where an access request has been made by the user computer 85, the server computer 82 transmits data existing at the position designated by the URL, to the user computer 85 being an access source through the network 88. On this occasion, the data is usually transferred in accordance with an HTTP (Hyper Text Transfer Protocol).

An IP (Internet Protocol) address is employed for identifying the user computer 85, but another code for position designation, such as URL, may well be employed. Additionally, a user ID, such as the input of a user's name or a predetermined code, can be employed in order to identify a user who operates the user computer 85.

Each of the computers is furnished with input means, such as a keyboard and/or a mouse, in order to input an instruction to the computer, and with a display device in order to display the processed result. Since each of the computers has a general-purpose and ordinary hardware construction, it is not described here in further detail.

In FIG. 3, the exchange of information based on the above arrangement of the computers is shown by a functional block diagram. The architecture of the illustrated system can be classified into the server computers 82 (analysis server 81 and accumulation server 83) and the user computer 85. The computers are not restricted to one server, but a plurality of servers may well be connected through the network so as to function as the system.

The accumulation server 83 being the server computer 82 includes an application unit 12, a questionnairring basic information storage unit 14 and a database unit 16. The respective units may well be constructed of computers, which are connected so as to be capable of exchanging information. The application unit 12 is a functional unit for executing various processes which chiefly include the exchanges of information with the other computers, and a process for deriving questionnairing information from the questionnairing basic information storage unit 14, transmitting the information to the user computer 85 and receiving a result from the user computer 85. The questionnairing basic information storage unit 14 is a storage unit for storing therein preset data (questions for questionnairing) which are necessary when awareness data for grasping knowledge assets are totalized and analyzed. The database unit 16 is a functional unit for accumulating therein the result of the questionnairing replied to by a subject, as the awareness data.

The analysis server 81 includes an application unit 22, an analytical program storage unit 24 and a database unit 26. The respective units may well be constructed of computers, which are connected so as to be capable of exchanging information. The application unit 22 is a functional unit for executing various processes that chiefly include the exchanges of information with the other computers, and a process for analyzing the questionnairing in accordance with a program stored in the analytical program storage unit 24. The analytical program storage unit 24 is a storage unit for storing therein the analytical program that analyzes the knowledge assets. The database unit 26 is a functional unit for previously accumulating therein criteria that are referred to when the knowledge assets are surveyed and evaluated.

[Outline]

This embodiment evaluates and diagnoses the operation of an enterprise based upon the above construction and from the standpoint of creating or utilizing knowledge, and automatically generates a community for enhancing the operation of the enterprise. First, information items are collected through a questionnaire on the awareness levels, working manners and etc. from individual employees, and the operating situation of the organization is diagnosed based upon the questionnaire so as to indicate a course of improvement or reform and to automatically generate a community of persons interested in particular knowledge or persons of similar work styles. Thus, it enables enhancement the intellectual productivity and creativeness of the organization.

Thus, first information items are collected through a questionnaire on the awareness levels, working manners and etc. from individual employees, and to diagnose the operating situation of the organization diagnosed based upon the questionnaire. On that occasion, various analysis are conducted so as to grasp the present circumstances and indicate the course of improvement or reform, and to make possible the extraction or specification of persons interested in particular knowledge or persons of similar work styles. Thus, it can also offer data (analytical results) that can enhance the intellectual productivity and creativeness of the organization.

Shown in FIG. 1 is a conceptual diagram concerning the circulation of various types of information. In this embodiment, knowledge assets are classified into at least three categories. The first category is the characteristic of individual working manners (temporal and spatial assets) 30, the second category is the characteristic of working manners in an organization (network-wise assets) 32, and the third category is a characteristic expressive of the sources of present and future profits (profit-making assets) 36. Also, the characteristic of knowledge-based management (knowledge-based management assets) 34 can be added to the three categories. The characteristic of individual working manners 30 is a group of awareness data expressing how subjects, such as the employees of the organization, utilize hours, while the characteristic of working manners in the organization 32 is a group of awareness data expressing how the subjects establish communication. The characteristic expressive of the sources of present and future profits 36 is a group of awareness data expressing knowledge presently possessed by the subjects and knowledge predicted to be obtained in the future. Furthermore, the characteristic of knowledge-based management 34 is a group of awareness data expressing to what extent items required for the execution of the knowledge-based management as presently possessed by the organization or the subjects. This awareness data is assumed here to have been accumulated by questionnairing beforehand.

In this embodiment, the knowledge assets are classified as stated above. Herein, the characteristic of individual working manners (temporal and spatial assets) 30 and the characteristic of working manners in the organization (network-wise assets) 32 express the aspects of motions of the subjects from the viewpoint of the knowledge assets and can therefore be grasped as feature assets pertaining to actions.

Although the characteristics of individual working manners 30, the characteristic of working manners in the organization 32, the characteristic of knowledge-based management 34 and the characteristic 36 are classified as the different categories as above, this embodiment is not restricted to independent categories. For example, the characteristic of individual working manners 30 and the characteristic of working manners in the organization 32 may well be considered mixed so as to be classified into one or more characteristics.

Correlation analysis 38 serves to conduct a correlation analysis based upon at least two of: the characteristic of individual working manners (temporal and spatial assets) 30, the characteristic of working manners in the organization (network-wise assets) 32, the characteristic expressive of the sources of present and future profits (profit-making assets) 36, and the characteristic of knowledge-based management (knowledge-based management assets) 34, Evaluation/generation 40 serves to evaluate an analytical result based on the correlation analysis 38, or to generate a community from the analytical result.

For example, (a) a knowledge asset that is important for an organization, or a knowledge asset to which subjects themselves contribute is first surveyed. This corresponds to investigating the characteristic expressive of the sources of profits (profit-making assets) 36. Subsequently, (b) the features of the ways of how the subjects themselves perform knowledge work (concretely, the characteristics of working manners, such as the ways in how the individuals spend hours, the places where they work, and their communications) are surveyed. This corresponds to investigating the characteristic of individual working manners (temporal and spatial assets) 30 and the characteristic of working manners in the organization (network-wise assets) 32. These surveys can be derived from the awareness data that are accumulated in the accumulation server 83. The questionnairing should preferably consist of questions for the surveys beforehand. Thus, the awareness data obtained from the user side serves directly as survey results This awareness data can be accumulated in the accumulation server 83. In addition, the awareness data may be accumulated as well as the survey results in the accumulation server 83.

In this embodiment, the survey (a) of the knowledge assets more concretely surveys which of the knowledge assets represents at present the source of the value of each enterprise. In this survey, the grasp and classification of knowledge assets are considered as a more concrete knowledge asset model (FIG. 6), and data is gathered through a questionnaire for the knowledge asset model. In gathering the data, each of the employees of the company (each staff member) is given ten coins, and he/she is instructed to arrange the ten coins in the knowledge asset model (FIG. 6), to obtain data concerning the present situation. Furthermore, each employee is instructed to arrange the ten coins regarding where knowledge assets considered important will shift. Thus, the common recognition of the employees can be surveyed regarding how the important knowledge assets will change in the future from the present, that is, what knowledge assets must be constructed henceforth.

Figure 6:
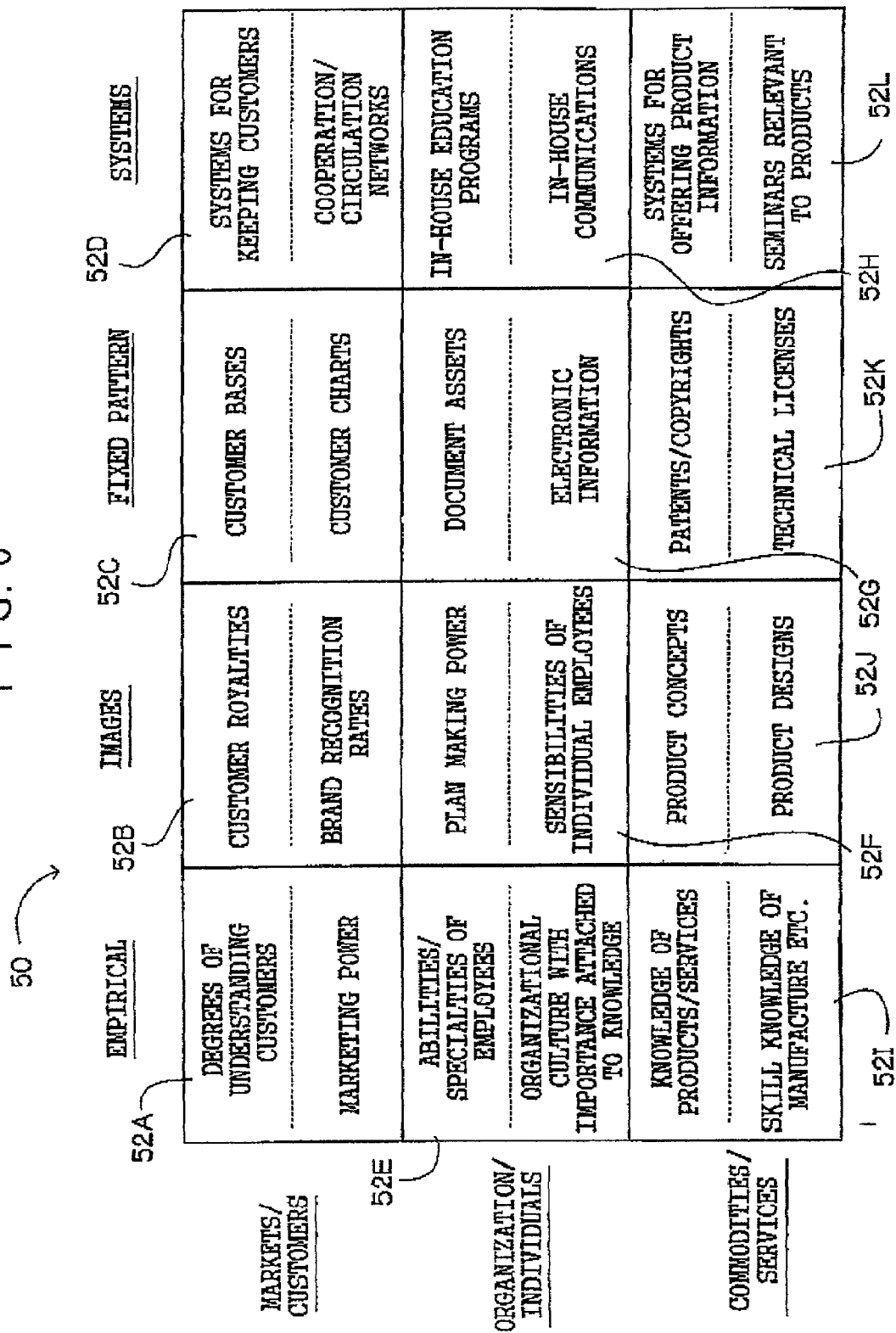
FIG. 6 is a conceptual diagram showing a practicable example of a knowledge asset model which concerns the grasp and classification of knowledge assets, according to this embodiment.

As shown in FIG. 6, a framework employed in this embodiment is a knowledge asset model in which knowledge assets being the sources of values important for an enterprise are layered into 12(3×4) cells 52A–52L. Taken on the axis or ordinates are three categories; knowledge of markets and customers, knowledge held by the organization and individuals, and knowledge embedded in commodities/services. The axis of the abscissas is classified into four categories; empirical knowledge such as the know-how items of sales and manufacturing, images such as brands and concepts, standardized knowledge such as documents and databases, and systems such as education programs and customer relations. The layering in the form of a knowledge asset model is a concept effective for detailed classification, and especially the concept of layering into 12 cells is a well-known technique (Noboru Konno: "Management of Knowledge assets" published by Nihon Keizai Shimbun, Inc.).

In the knowledge asset model 50 of FIG. 6, regarding the knowledge of markets and customers, the layer of empirical knowledge assets such as the know-how items of sales and manufacturing is set as the cell 52A, which is a subcategory expressing the degrees of understanding of customers and marketing power. Regarding the knowledge of markets and customers, the layer of the knowledge assets of the images such as brands and concepts is set as the cell 52B, which is a subcategory expressing customer loyalties and brand recognition rates. Furthermore, regarding the knowledge of markets and customers, the layer of the standardized knowledge assets such as documents and databases is set as the cell 52C, which is a subcategory expressing customer bases and customer charts. Regarding the knowledge of markets and customers, the layer of the knowledge assets of the systems such as education programs and customer relations is set as the cell 52D, which is a subcategory expressing systems for keeping customers and cooperation/circulation networks.

Likewise, the layer of the empirical knowledge assets regarding the knowledge held by the organization and individuals is set as the cell 52E, which is a subcategory expressing the abilities/specialties of employees and organizational culture with importance attached to knowledge. The layer of the image knowledge assets regarding the knowledge held by the organization and individuals is set as the cell 52F, which is a subcategory expressing plan making power and the sensibilities of the individual employees. Furthermore, the layer of the standardized knowledge assets regarding the knowledge held by the organization and individuals is set as the cell 52G, which is a subcategory expressing document assets and electronic information. The layer of the systemic knowledge assets regarding the knowledge held by the organization and individuals is set as the cell 52H, which is a subcategory expressing in-house education programs and in-house communications.

In addition, the layer of the empirical knowledge assets regarding the knowledge embedded in commodities/services is set as the cell 52I, which is a subcategory expressing the knowledge of products/services and the skill-like knowledge of manufacturing and etc. The layer of the image knowledge assets regarding the knowledge embedded in commodities/services is set as the cell 52J, which is a subcategory expressing product concepts and product designs. Furthermore, the layer of the standardized knowledge assets regarding the knowledge embedded in commodities/services is set as the cell 52K, which is a subcategory expressing patents/copyrights and technical licenses. Still further, the layer of the systemic knowledge assets regarding the knowledge embedded in commodities/services is set as the cell 52L, which is a subcategory expressing systems for offering product information and seminars relevant to products.

The twelve cells 52A–52L expressed by the knowledge asset model 50 in FIG. 6 can be considered as knowledge items into which the knowledge assets are classified, and which are broadly divided as follows: AS categorized along the axis of abscissas in the example of FIG. 6, the knowledge items are divided into the layer of the empirical knowledge assets (including, for example, the cell 52A), the layer of the image knowledge assets (including, for example, the cell 52B), the layer of the standardized knowledge assets (including, for example, the cell 52C), and the layer of the systemic knowledge assets (including, for example, the cell 52D).

Regarding the layer of the empirical knowledge assets as expressed by the knowledge asset model 50, the items concerning the empirical knowledge can be generated as a questionnaire, and regarding the layer of the standardized knowledge assets, the items concerning the standardized knowledge can be generated as a questionnaire, so that the principal knowledge items of the knowledge assets concerning subjects such as employees can be generated as a questionnaire.

Accordingly, the present situation or the future predictive situation can be surveyed in such a way that the employees place coins to the knowledge items which they consider as the present situation or the future predictive situation.

For example, the knowledge items to which the coins have been placed by the plurality of subjects such as employees are input, whereby at least one awareness data of first awareness data being the knowledge items presently important for an organization to which the subjects belong and second awareness data being the knowledge items to become important for the organization in the future can be calculated for every knowledge item.

The subjects for the knowledge items are not restricted to the employees. The members of the management can also be included as subjects.

An analysis is made based upon awareness data accumulated in the accumulation server 83, for example, the two survey results mentioned above, and two analytical results ((1), (2)) stated below are output. (1) The correlation between the two survey results is taken, thereby to obtain the following two data (1a, 1b): (1a) Data is obtained for understanding what knowledge assets must be created for increasing competitive power peculiar to the enterprise (core competence). Deviations between the employees, between management and the employees, and between managements are derived to obtain corresponding data. Thus, the deviations can be verified. (1b) Data is obtained for grasping what knowledge works are to be aided in for increasing the competitive power (core competence).

(2) Based upon the two survey results, a community consisting of subjects interested in particular knowledge or persons of similar work styles are automatically generated. Furthermore, the subject searches for a community to which he/she belongs, and a repository, ML (mailing list), forum, or the like relating to the community is automatically built.

When the knowledge asset model 50 of FIG. 6 is taken as an example, a plurality of knowledge items which include, at least, the items concerning the empirical knowledge and the items concerning the standardized knowledge are presented (displayed) to a plurality of subjects so as to be selectively imputable.

Regarding a plurality of knowledge items which include, at least, the items concerning the empirical knowledge and the items concerning the standardized knowledge, the knowledge items input by the plurality of subjects and being presently important for an organization to which the subjects belong are accumulated as first awareness data, and the number of inputs of every knowledge item is calculated. The knowledge items input by the plurality of subjects and to become important for the organization in the future are accumulated as second awareness data, and the number of inputs of every knowledge item is calculated. Analysis are made by comparing calculated results which concern the first awareness data, and calculated results which concern the second awareness data, and the results of the comparisons are displayed in correspondence with the respective knowledge items as analytical results. Thus, it facilitates understanding and estimating situations at present and in the future.

In this case, when subjects belonging to the management input the knowledge items being presently important for the organization to which they belong, and the knowledge items that will become important in the future, input results can be displayed together with comparison results from the employees or the like.

[Operation of Embodiment]

Next, the operation of this embodiment will be described. This embodiment will be explained as to a case where the server computers 82 function as WWW (world wide web) servers, while the user computers 85 function as WWW clients. In this case, a network accessible program (so-called "WWW browser") is installed in each user computer 85, and the user computer 85 can access the server computer 82 through the network 88 by starting the WWW browser. An access position (data formed by the position of the server computer 82 of an access destination, and the position of information in the server computer 82) is designated by a so-called "URL (Uniform Resource Locator)".

<Accumulation Server (1)>

Figure 4:
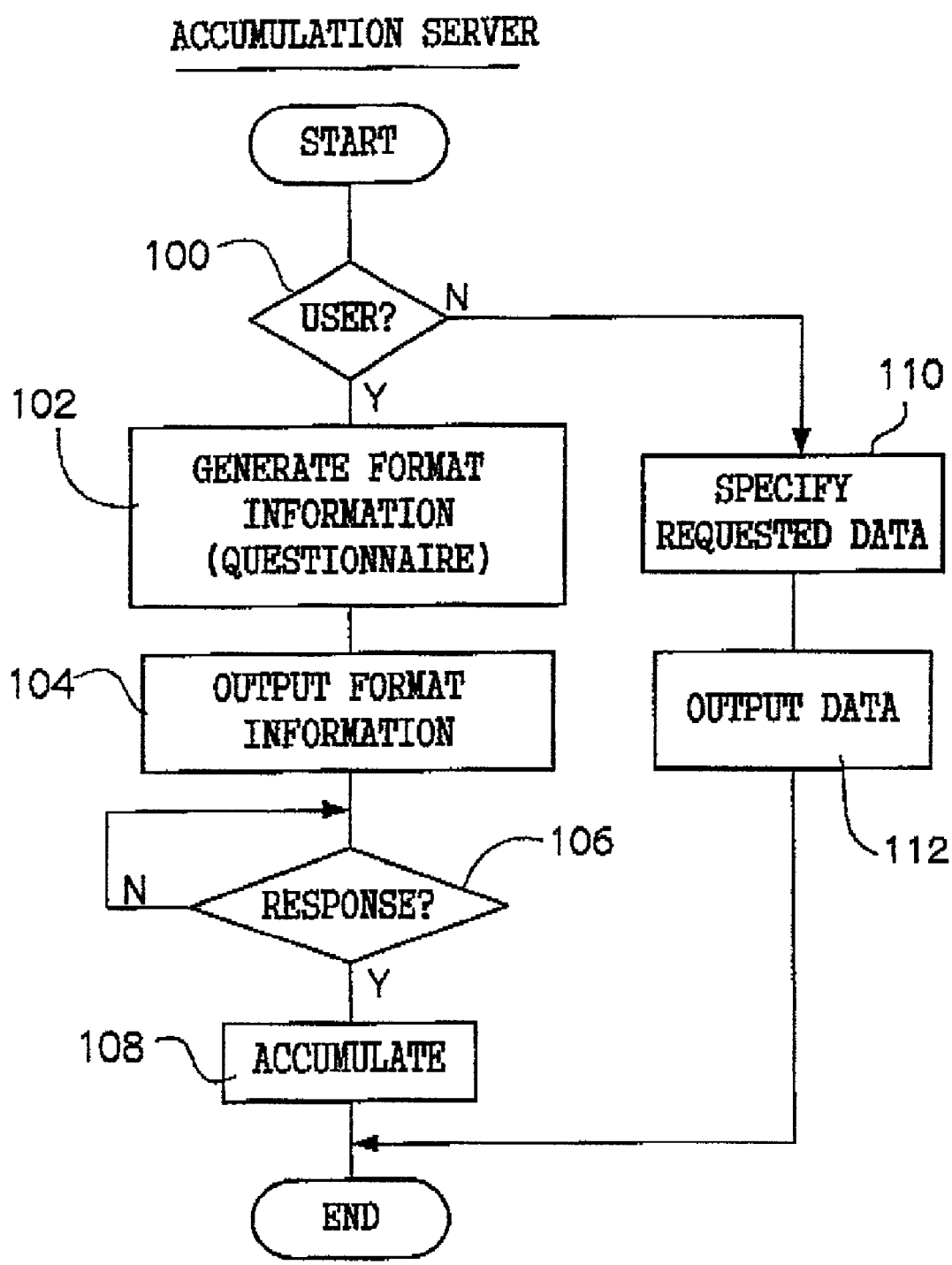
FIG. 4 is a flow chart showing the flow of the processing of an accumulation server.

First, in a case where a request for access to the site (knowledge asset utilization aid site) has been issued from the user computer 85 to the server computer 82, a processing routine shown in FIG. 4 is executed in the accumulation server 83 of the server computer 82. Concretely, whether the access request has been made by the user computer 85 or by the other server computer 82 is determined at step 100 in FIG. 4. Since, in this case, the user computer 85 is pertinent as to the determination of step 100 (that is, the determination is affirmative), initialization at step 102 is so executed that the format information of a screen to be displayed on the user computer 85 is generated and that data is generated and transmitted to the user computer 85 through the network 88. Thus, a questionnaire for collecting data necessary for the utilization of knowledge assets is presented to the user computer 85, Each subject checks or selects corresponding items while referring to the questionnaire presented to the user computer 85, to thereby input a reply to the questionnaire. When the input operation has ended, the input data is transmitted from the user computer 85 to the accumulation server 83 (step 104). Subsequently, when response is acknowledged at step 106 in the accumulation server 83, the routine proceeds to step 108.

In order to obtain the reply based on the knowledge asset model 50 shown in FIG. 6, coins are placed on the items. The numbers of coins placed on the respective items is transmitted as data.

At step 108, the data input by the subject is read and accumulated as awareness data in the database, whereupon the routine ends. In the accumulation, the data input by the subject and the questionnaire items are maintained in correspondence.

<Questionnaire>

In this embodiment, the format information of the questionnaire for collecting the data necessary for the utilization of the knowledge assets contains attribute information for each subject. The attribute information is composed of such items as the age and sex of the subject, the position (managerial post or responsibilities) of the subject in the organization, the number of other subjects falling under the particular subject administration, the work performed by the subject, and the term, e. g., years of work experience of the subject.

In order to make it convenient for the subject to reply, the format information contains reply information classified into the viewpoints between the organization and knowledge, between an individual and knowledge, and between a place and knowledge. First, items adopted for obtaining replies to the viewpoint between the organization and the knowledge take precedence and are the important assets of the organization, organizational use of the knowledge, and etc. Furthermore, items adopted for obtaining replies to the viewpoint between the individual and the knowledge are the process of knowledge creation/utilization, contribution to knowledge assets, the utilization of the place and time of handling (operations and work), and etc. Still further, items adopted for obtaining replies to the viewpoint between the place and the knowledge are the place of the knowledge creation/utilization, a community in the case of exchanging the knowledge, and etc. Examples will be explained below, Regarding the items adopted for obtaining replies to the viewpoint between the organization and the knowledge as taking precedence, capabilities possessed by the organization are classified into a large number of matters, and opinions on the matters at present and in the future can be submitted as a reply. In a case where the organization is, for example, a manufacturer, the matters can be prepared in the form of questions so that opinions on development capability, technological capability, planning capability, sales promotion capability, and etc. at present and in the future can be submitted as a reply. Regarding the important knowledge assets, the matters can be prepared in the form of questions so that opinions on which of and to what degree knowledge assets categorized and classified into properties are important at present and in the future in terms of bringing profit to the enterprise. Furthermore, regarding the item of the organizational use of the knowledge, opinions on a large number of matters possessed with respect to the knowledge by the organization can be submitted as a reply. Opinions and remarks on maintaining and increasing competitive capability can also be asked.

Regarding the process of knowledge creation/utilization, the contribution to knowledge assets, the utilization of the place and time of handling (operations and work) as items for obtaining replies to the viewpoint between the individual and the knowledge, places and hours for intellectual utilization and the degrees of importance are classified into a large number of matters pertaining to routine work, and the matters can be prepared in the form of questions so that opinions can be submitted as a reply.

Regarding the item of the place of the knowledge creation/utilization as is the item for obtaining replies to the viewpoint between the place and the knowledge, the places where and how the subject deals with operations are classified into a large number of matters, and the matters can be prepared in the form of questions so that the subject can reply by opinions and degrees according to the subject's impressions. Regarding the item of the community where knowledge is exchanged or distributed, sharing and cooperation about the exchange of information with persons other than the particular subject, as is predicted to be possessed by the subject, are classified into a large number of matters, and the matters can be prepared in the form of questions so that the subject can reply by opinions on the degrees of importance.

The items for obtaining the replies based on the knowledge asset model 50 shown in FIG. 6, that is, the characteristic 36 expressive of the sources of the present and future profits may be so formed that the items corresponding to the cells stated before are determined beforehand, and that the number of coins can be input to every item.

The above format information is maintained as stored in the questionnairing basic information storage unit 14 of the accumulation server 83, while the replies from the subject are accumulated in the database unit 16.

<Accumulation Server (2)>

In a case where an access request has been issued from the analysis server 81 to the accumulation server 83 as will be explained later, the determination of step 100 of the accumulation server 83 in FIG. 4 is negative. Then, the routine proceeds to step 110, at which requested data is specified. Since, in this case, the request has been made by the analysis server 81, a request for the awareness data of subjects is specified, the awareness data necessary for utilizing knowledge assets are output to the analysis server 81 at the next step 112, whereupon the routine ends.

<Analysis Server>

Figure 5:
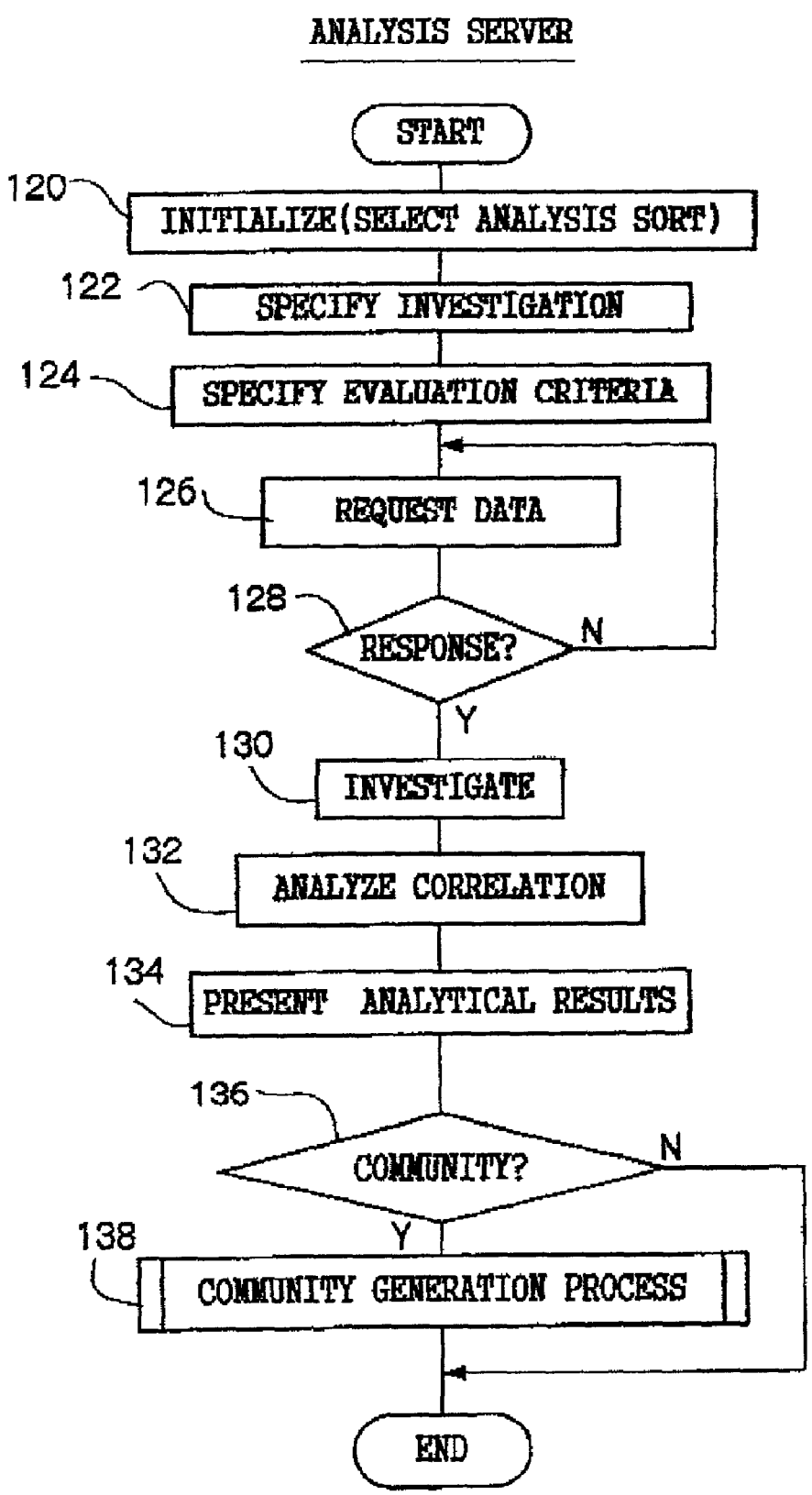
FIG. 5 is a flow chart showing the flow of the processing of an analysis server.

Next, the operation of the analysis server 81 will be explained. A processing routine shown in FIG. 5 is executed in the analysis server 81. At step 120 in FIG. 5, an analysis type expressing how awareness data are analyzed in order to utilize knowledge assets is selected as initialization. What survey is to be conducted for the analysis type set at step 120, by the use of the awareness data, is specified at the subsequent step 122, and criteria in the survey and the analysis are specified at the subsequent step 124. After the analytical conditions have been set in this way, a data request is issued to the accumulation server 83 so as to output the awareness data at the subsequent step 126 Whether a response has been received from the accumulation server 83, in other words, if the awareness data have been output therefrom, is determined at a subsequent step 128. Until the response is acknowledged, the data request is reiterated at step 126.

When the acknowledgment has been determined as having been received by step 128, the routine proceeds to step 130, at which the awareness data output from the accumulation server 83 are accepted to perform the survey. At the subsequent step 132, a correlation analysis is made based upon the results of the survey at step 130. At the subsequent step 134, the results of the analysis at step 132 are presented. The presentation of the analytical results may be performed by transmitting these results to the predetermined user computer 85 through the communication link 88. Alternatively, the analytical results may well be stored as data so as to be accessible.

At the subsequent step 136, whether or not a community is to be generated based upon the analytical results is determined. As a criterion here, whether or not the community is to be automatically generated is set beforehand, whereby the determination can be easily made. The community to be automatically generated includes a repository, ML (mailing list), forum, and etc. when the determination is negative at step 136, the routine ends, and when the judgment is affirmative, the community is automatically generated at step 138, whereupon the routine ends.

<Examples of Practicable Processes of Analysis Server>

Next, the practicable processes of the analysis server 81 will be explained. The processes of the analysis server are broadly divided into a survey and an analysis.

(Survey)

The survey is performed using reply information classified into the viewpoints between an organization and knowledge, between an individual and knowledge, and between a place and knowledge as given by each subject in accordance with the format information explained above. More specifically, data corresponding to the survey stated below, among the data of the respective matters of the reply information, are previously set and are extracted, whereby the data for use in the survey is prepared.

Adopted in this embodiment are two categories of surveys; the survey of the knowledge strategy of the organization (survey A), and the survey of the work styles of the subjects of the organization (survey B).

(Survey of Knowledge Strategy of Organization)

The survey of the knowledge strategy of the organization includes a knowledge asset survey (survey A1) and a knowledge-based management degree survey (survey A2).

1. Knowledge asset survey (survey A1)

This survey is to make a survey into knowledge assets important for an organization, that is, its intellectual capital. In other words, it is to survey the characteristic expressive of the sources of present and future profits (profit-making assets) 36 as shown in FIG. 1. As the result of this survey, the subjects of the organization are classified in consideration of the following three knowledge domains, and from the viewpoints of competition priorities at present and in the future, whereby the organization can be divided:

(1) Knowledge domain which is important at present for the organization (2) Knowledge domain which becomes important in the future for the organization (3) Knowledge domain to the construction of which the individuals contribute More specifically, as to the subjects (constituent members) of an organization, the information items of the above knowledge domains (1) and (2) are accumulated, whereby the organization can be divided in four by the two axes of (Degree of Concentration of Knowledge)×(Degree of Variation). That is, as shown by an image 46 in FIG. 1, medium data which is neither high nor low is set as the divisional axis for the degree of concentration of knowledge, and also medium data is set as the divisional axis for the degree of variation, whereby the organization can be divided into four types (written as (1), (2), (3) and (4) within the image 46 in FIG. 1). By determining whether the contribution domain of the above knowledge domain (3) inclines to the knowledge domain (1) or to the knowledge domain (2), the organization that has been divided into four types can be further classified into a "status quo" reinforcement type and a revolutionary type. That is, as shown by an image 48 in FIG. 1, the degree of contribution to knowledge is afforded to the image 46, whereby the organization can be further classified into the status quo reinforcement type and the revolutionary type.

The knowledge asset model 50 explained before can be adopted for the survey A1.

Figure 7:
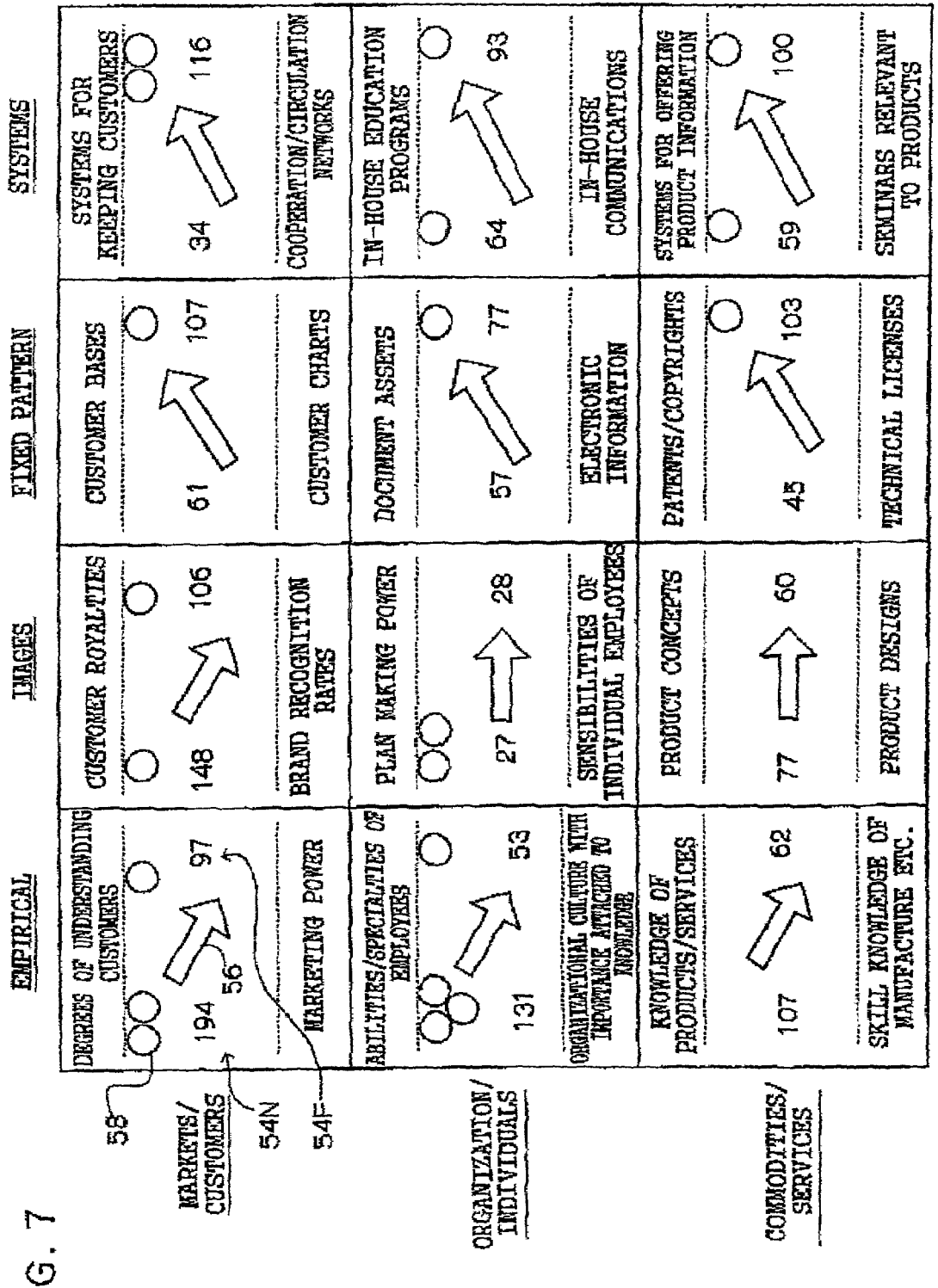
FIG. 7 is a diagram of images exemplifying survey results in the case of adopting the knowledge asset model 50 shown in FIG. 6.

FIG. 7 exemplifies the survey results of an enterprise. The recognitions of the degree of importance of knowledge assets at present and in the future as have been obtained as the survey results are indicated in each cell. That is, in each cell, an importance of degree of recognition value 54N is indicated as the numerical value of the degree importance recognition at present, and degree of importance recognition value 54F is indicated as the numerical value of the degree importance recognition in the future. The tendency of the degree importance recognition of the knowledge assets from the present into the future is indicated by an arrow 56.

In addition, balls 58 are indicated in some of the cells. The balls 58 indicate the cells on which the CKO (chief knowledge officer who is the top management person responsible for knowledge management) of the enterprise placed coins. The balls 58 are placed on the cells according to the input from the CKO, as to the present or/and the future. It can be seen from the example of FIG. 7 is that the CKO considers at present empirical knowledge on customers, empirical knowledge possessed by individuals and the organization, concept building power, and the like as top priorities. As is also recognizable, the CKO considers that, in the future, the importance of the items will lessen, so the relative importance of the knowledge assets must be shifted to more systematic items such as a database, documents, and a customer keeping system. Substantially the same common recognitions are observed among the employees of the enterprise. This is also understood from the tendencies of the arrows 56 shown in FIG. 7.

From the survey results concerning the knowledge assets, each enterprise can know what new knowledge assets must be acquired in the future, in addition to the knowledge assets that are the sources of its strength at present.

The degree of contribution to the knowledge assets by each employee can be grasped by asking each employee to input how he/she contributes to the creation/construction of the knowledge assets respectively corresponding to the twelve cells 52A–52L shown in FIG. 6.

Thus, it can reveal who contributes to the knowledge assets being important for the enterprise, and who contributes to the construction of the knowledge assets to be acquired in the future.

This corresponds to calculating the numbers of inputs of the accumulated first and second awareness data input for the respective knowledge items by the plurality of subjects, and further accumulating information on the subjects' degrees of contribution to the plurality of knowledge items as input by the plurality of subjects, as third awareness data, and then specifying the subjects who input the data on the degrees of contribution to selected ones of the knowledge items.

In this case, a work style which includes autonomy, interaction (dependency and relevancy) with other subjects relevant to the work, and a place where the work is dealt with, and which is prestored for each specified subject, is compared with a prestored work style which is thought ideal, whereupon differences between work styles can be presented.

Figure 8:
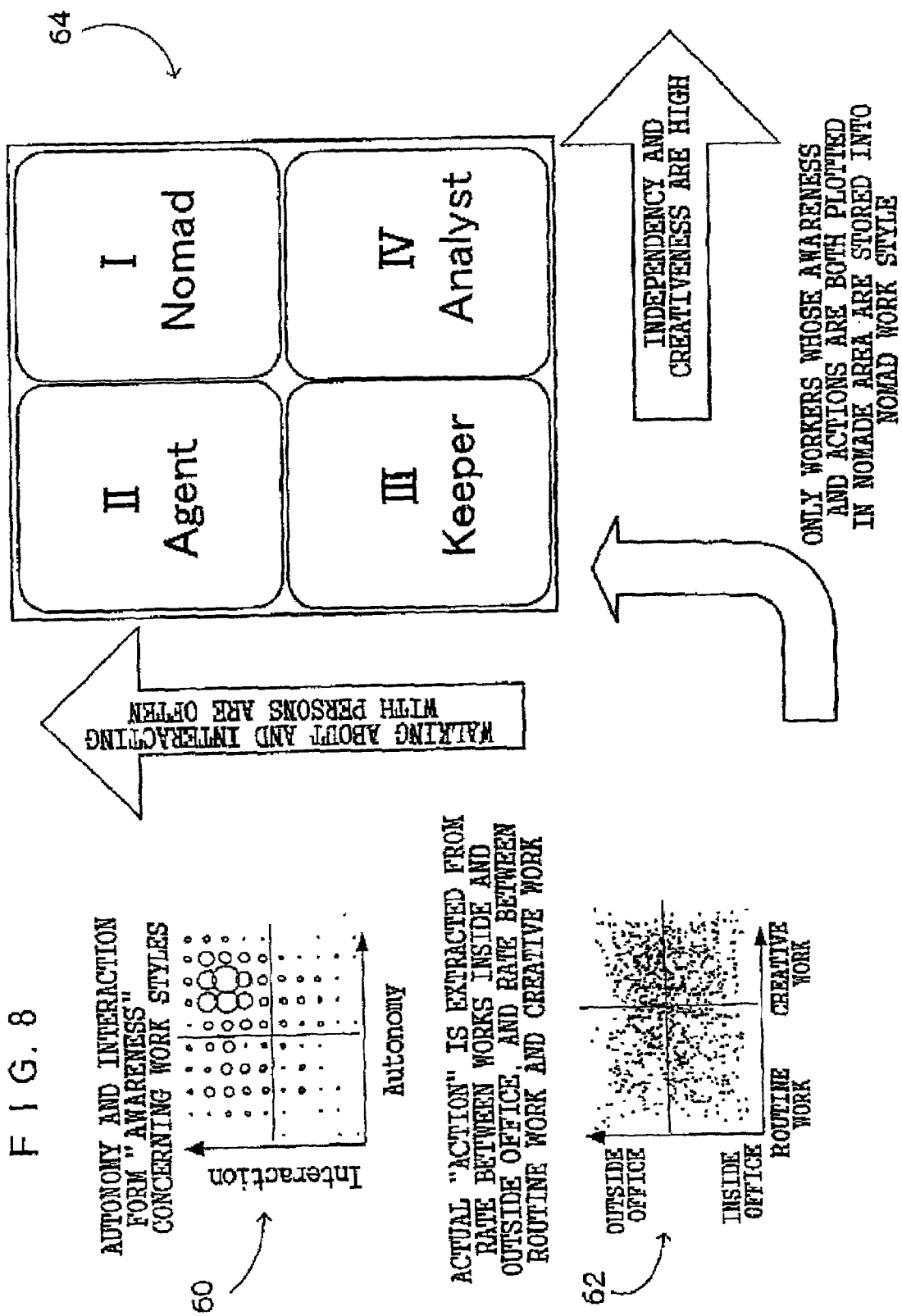
FIG. 8 is a diagram of images showing a process for classifying knowledge workers into four work styles.

Subsequently, how the knowledge creation of each worker contributing to the construction of the knowledge asset to be acquired in the future ought to be supported is diagnosed from the work style of the worker. The diagnosis is executed using a predetermined diagnostic program. In this embodiment, the time utilization survey (TUS) of DEGW Company is employed. With the TUS, knowledge workers can be classified into four work styles. FIG. 8 shows the results of the diagnosis.

In FIG. 8, the distribution of "awareness" concerning work styles is supposed in correspondence with an image 42 in FIG. 1, and it is assumed to be determined from the relationship between autonomy and interaction. More specifically, as shown by an image 60, the interaction extends along the axis of ordinates, while the autonomy extends along the axis of abscissas, and the distribution thereof is set as the distribution of the "awareness" concerning the work styles. An actual "action" is supposed in correspondence with an image 44 in FIG. 1, and it is assumed to be determined from the relationship between a place where the worker works and the aspect of his/her work. More specifically, as shown by an image 62, the rate at which the worker works in the places inside and outside an office extends along the axis of ordinates, while the rate between the routine work and the creative work extends along the axis of abscissas, and the distribution thereof is set as a distribution concerning the actual "action".

Regarding the distribution of the awareness and that of the "action", data which does not correspond to any of the choices are set as divisional axes, whereby each of the respective categories can he divided into four subcategories. As shown in an image 64, which of the four knowledge work styles the worker corresponds to can be found from the corresponding subcategories of the images 60 and 62. The four knowledge work styles are the styles of a nomad type worker, an agent type worker, a keeper type worker and an analyst type worker.

The sorting corresponds to employing a "awareness index" specified by the autonomy and the interaction, in addition to an "action index" indicating how long the worker works inside and outside the office, respectively, and how time periods are respectively allocated to the routine work and the work requiring concentration. The person who is practicing the creative and interactive work in both the "awareness" and the "action" as is found by multiplying the two indexes, shall be called the nomad type worker.

The nomad type worker has the work style in which the worker has higher independence and creativeness, and he/she more often walks about interacting with other persons. In the example of FIG. 8 showing results obtained by investigating 1,186 samples in total, 29.8% of all the workers correspond to the nomad type. The analyst type worker has the work style in which autonomy is higher, but interactions with other persons are rarer, and 33.8% of all the workers correspond to the analyst type. Furthermore, the agent type worker has the work style in which autonomy is lower, but interactions are higher, and 19.8% of all the workers the agent type. On the other hand, the keeper type worker has the work style in which both autonomy and interactions are lower, and 16.6% of all the workers correspond to the keeper type.

Directly, the worker contributing to the construction of important knowledge assets is the nomad type worker, and he/she supports works corresponding to his/her work style. Concretely, the arrangement of a mobile work environment, the preparation of a call center for offering information, and etc. He/she arranges an environment for the analyst type worker by enriching a mailing list or a know-how database, in order that the analyst type worker may be obtain necessary knowledge at his/her desk.

The work style feature of each section of the enterprise where the survey was made can be found, depending upon how the workers of the specified types are distributed in the section. Indirectly, regarding a section which forms a key to the contribution to the construction of important knowledge assets, namely, a section where many workers contribute to the construction of important knowledge assets, an environment adapted to the work style features of the section is built.

2. Knowledge-based Management Degree Survey (Survey A2)

This survey is to survey if the requirements for knowledge-based management are fulfilled. In other words, it is to survey the characteristic of knowledge-based management (knowledge-based management assets) 34 as shown in FIG. 1. Here, the requirements of the knowledge-based management are listed for the items of (1) vision, (2) practicing ability, (3) technology and (4) culture, and survey is made as to whether or not those requirements are fulfilled. As a result of this survey, it is possible to classify the enterprise by the degree of success of its knowledge-based management.

Figure 9:
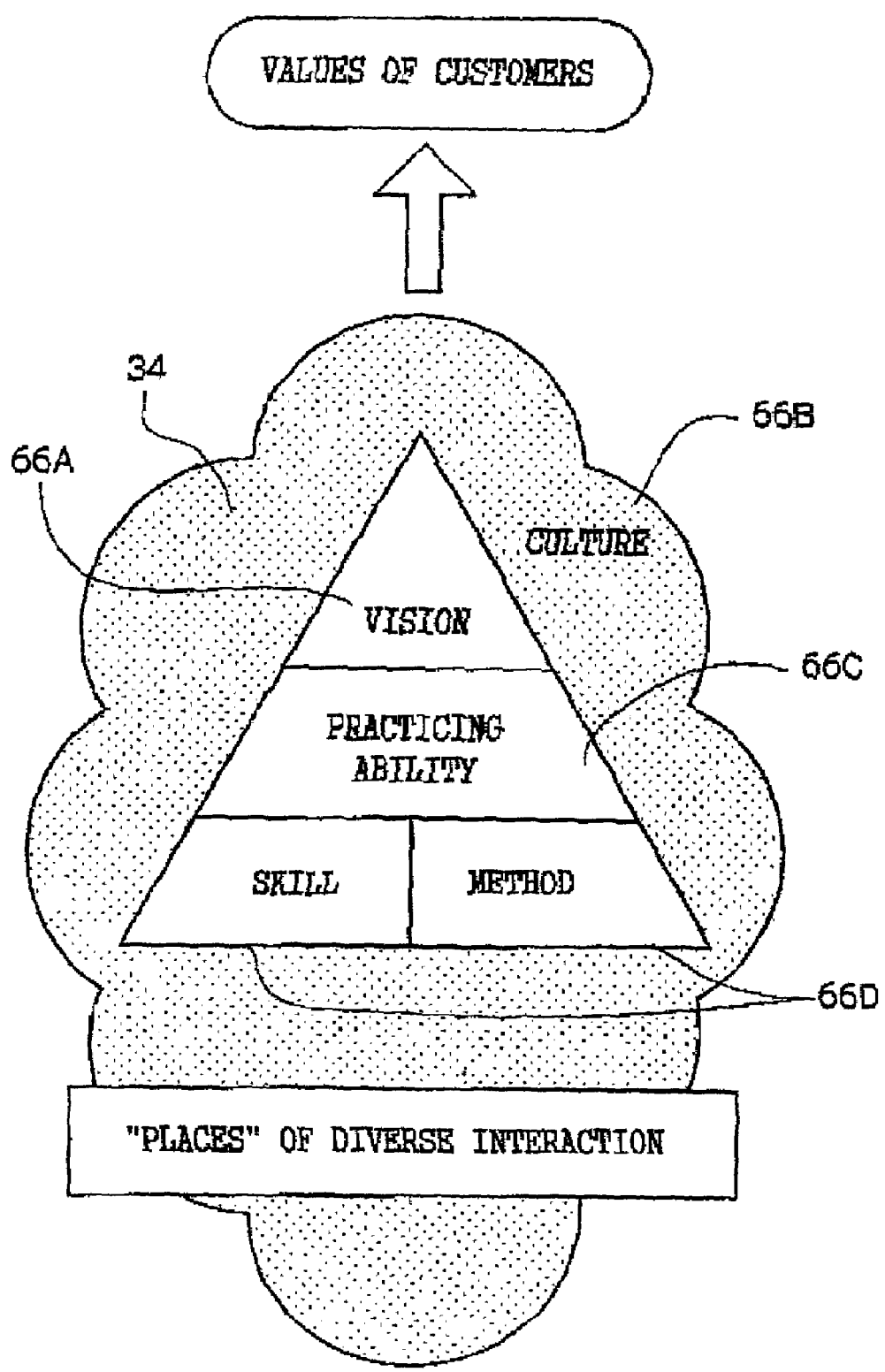
FIG. 9 is a diagram of images in the case of classifying knowledge-based management characteristic.

More concretely, as shown in FIG. 9, a plurality of (10 in this embodiment) questions are asked as to the four items of the characteristics of knowledge-based management 34 shown in FIG. 1; vision 66A, culture 66B, practicing ability 66C and technology (comprising technology and method) 66D, and the degree of the knowledge-based management is evaluated from the replies to the questions. The vision 66A expresses clear strategic intention (managing strategic intention or undertaking strategic intention) of the top management, while the culture 66B expresses learning environment promoting a knowledge community The practicing ability 66C expresses practicing ability of knowledge of best practices (awareness reform or organizational reform), while the technology 66D expresses IT aiding in practicing activities and also the methodology.

The ten questions for the items, for example, "Does the top management repeatedly talk about the importance of knowledge?" as to the "clear strategic intention of the top management" of the vision 66A, are respectively replied to in five stages from "Very true(5)" to "Not true at all (1)", and the replies to the questions are totaled so as to determine the score of the particular item. Such scores for all the items are totaled, whereby the degree of knowledge-based management for each section can be surveyed.

(Survey of Work Styles of Subjects of the Organization)

The survey of the work styles of the subjects of an organization includes a time/place utilization survey (survey B1) and a human network survey (survey B2).

1. Time/place Utilization Survey (Survey B1)

This survey concerns the work styles of individuals, and is to conduct a survey on the manners of daily duties or the likes (termed "work" below) as includes the degrees of autonomy and interaction, where the subjects work, and so forth. In other words, it is to survey the characteristics of individual working manners (temporal and spatial assets) 30 as shown in FIG. 1. As the result of the survey, the subjects of an organization are classified in consideration of the following two manners of work and from the viewpoint of the work styles, whereby the organization can be divided:
(1) How autonomously the subjects work
(2) How much the subjects move about in performing the work More specifically, as to the subjects (constituent members) of the identical organization, the information items of the above working manners (1) and (2) are accumulated, whereby the organization can be divided into four types by the two axes of (Interaction)×(Autonomy). That is, as shown by the image 42 in FIG. 1, medium data which is neither high nor low is set as the divisional axis for interaction of the subject, and also medium data is set as the divisional axis for autonomy, whereby the work styles can be divided in four (written as (1), (2), (3) and (4) within the image 42 in FIG. 1).

2. Human Network Survey (Survey B2)

This survey is to conduct a survey into sharing and links that relate to the work of subjects. In other words, it is to survey the characteristic of working manners in the organization (network-wise assets) 32 as shown in FIG. 1. The survey B2 includes the following community survey:

Community Survey

This surveys which human networks (1) a work group, (2) a project team, (3) a community of practice (practical network) and (4) an informal network each subject depends upon in acquiring necessary knowledge. As the result of the survey, the dependencies of the work styles of the subjects of the organization upon the human networks can be grasped. More specifically, as shown by the image 44 in FIG. 1, the degrees of dependencies upon the work group, the project team, the community of practice (practical network) and the informal network are connected as to the activities of the subjects, whereby the dependencies upon the human networks can be grasped.

(Correlation Analysis)

A correlation analysis is made based upon data obtained by the surveys explained above. In this embodiment, the correlation analysis is made for the relationship between the results of two surveys. Examples of the correlation analysis will be discussed below.

1. Analysis Between Knowledge Asset Survey and Work Style Survey (Correlation Analysis C1)

In this correlation analysis C1, the flexibility of the organization can be analyzed from the viewpoint of the work styles of the subjects, and whether the organization has a status quo reinforcement type tendency or a revolutionary type tendency as to the knowledge asset strategy can be obtained as an analytical result. For example, when the knowledge asset strategy aims at the revolutionary type, both the autonomy and outward orientation must be intense as a work style.

In this embodiment, the correlation analysis was made on 1,186 sample data (awareness data) in total, based upon the transition of knowledge from the present into the future. As a result, the sample data could be clustered into four patterns as shown in FIG. 10. Type I is the cluster of the recognition that the advantage of a brand or commodity concept must be changed into a system in which organizational power can be demonstrated. Type II is the cluster in which empirical knowledge possessed solely by a business or technological section is to be shared through an IT system or the like and to be joined to the organizational power. Type III or Type IV is the cluster in which the advantage of the empirical knowledge or the brand/concept having heretofore been enjoyed is to be maintained and to be intensified still more. In this manner, the awareness data can be classified into the four clusters.

The classification into these clusters corresponds to displaying a plurality of knowledge items which include at least an item corresponding to empirical knowledge and an item corresponding to standard knowledge, accumulating as first awareness data the knowledge items input by a plurality of subjects and being presently important for an organization to which the subjects belong, so as to calculate the number of inputs for every knowledge item, and also accumulating as second awareness data the knowledge items input by the plurality of subjects, to become important for the organization in the future, so as to calculate the number of inputs for every knowledge item, comparing the calculated result of the first awareness data with that of the second awareness data, and classifying the organization into a plurality of patterns based upon the result of the comparison.

Whether the enterprise is actually being changed, can be checked by examining a rate as to if the workers having exhibited the types I and II among the patterns are highly autonomous.

2. Analysis Between Knowledge Asset Survey and Human Network Survey (Correlation Analysis C2)

In this correlation analysis C2, the flexibility of an organization can be analyzed from the viewpoint of the human network of subjects, and whether the organization has a status quo reinforcement type tendency or a revolutionary type tendency as to a knowledge asset strategy, can be obtained as an analytical result. For example, when the knowledge asset strategy aims at the revolutionary type, the human network must have a high degree of dependency upon a community of practice.

In an example of this embodiment, whether the enterprise is actually being changed, can be checked by examining a rate as to if the workers having exhibited the types I and II among the patterns shown in FIG. 10 are highly dependent upon the community of practice in the image 44 of FIG. 1. The same holds true also of correlation analysis C3 through C6 explained below.

3. Analysis in Which Work Style Survey and Human Network Survey Are Combined and Then Combined With Knowledge Asset Survey (Correlation Analysis C3)

In this correlation analysis C3, the degrees of contribution to knowledge assets can be analyzed, and an organization can be analyzed from the viewpoints of the work styles and human networks of subjects. For example, correlation is surveyed between the autonomy/outward orientation of the work style and the degree of dependency thereof upon the community (human network). The subjects can be categorized into four groups in accordance with the autonomy/outward orientation and group orientation/community orientation. How much the subjects of the respective categories contribute to the knowledge assets, can be grasped.

4. Analysis Between Knowledge Asset Survey and Knowledge-based Management Degree Survey (Correlation Analysis C4)

In this correlation analysis C4, the change of knowledge assets can be analyzed, and an organization can be analyzed from the viewpoint of the knowledge-based management of the organization. For example, in case of continuously making the survey with an evaluating axis set at whether or not the knowledge-based management is proceeding favorably, continuity and enhancibility in the degree of knowledge asset management can be obtained as analytical results by checking if enhancement in the degree of knowledge asset management and the shift of the knowledge assets into an ideal form are proportional.

5. Analysis Between Knowledge-based Management Degree Survey and Work Style Survey (Correlation Analysis C5)

In this correlation analysis C5, the change of knowledge assets can be analyzed, and an organization can be analyzed from the viewpoints of the knowledge-based management and work styles of the organization. For example, in case of continuously making the survey with an evaluating axis set at whether or not the knowledge-based management is proceeding favorably, continuity and enhancibility in the degree of knowledge asset management can be obtained as analytical results by checking if enhancement in the degree of knowledge asset management and the shift of the work styles into an ideal form are proportional.

6. Analysis Between Knowledge-based Management Degree Survey and Human Network Survey (Correlation Analysis C6)

In this correlation analysis C6, the shift of knowledge assets can be analyzed, and an organization can be analyzed from the viewpoints of the knowledge-based management and human network of the organization. For example, in case of continuously making the survey with an evaluating axis set at whether or not the knowledge-based management is proceeding favorably, continuity and enhancibility in the degree of knowledge asset management can be obtained as analytical results by checking if enhancement in the degree of knowledge asset management and the shift of the human network into an ideal form are proportional.

As a result of these analysis, it is possible to derive the difference between knowledge assets at present and in the future, and the tendency of the knowledge assets from the present into the future. It is also possible to derive how knowledge assets to be enhanced in the future are led, from the difference between the knowledge assets at present and in the future.

A survey and an analysis are conducted using the data collected from the subjects of the organization and then accumulated, and a community is generated based upon analytical results. The community is generated for the subjects based on the analytical result, for example, whose work styles are intense in both autonomy and outward orientation. Thus, the community meeting a purpose can be generated within the organization. Criteria for generating the community may be stipulated by the inputs of a predetermined administrator or the like, or input values aiming at the enhancement of knowledge assets may well be stipulated as the criteria beforehand. Alternatively, a community which consists of the subjects exhibiting a high degree of concentration may well be generated for every analytical result.

Concretely, the "community" is a set of workers who have a common feature from a certain viewpoint. The "generation of the community" signifies that a network is visualized to the group of workers coupled from the certain viewpoint, thereby to facilitate open communications between the workers. More concretely, data that indicates (1) what binds the member of the community, and (2) who are the members of the community are provided to all of the members. A method for providing the information is, for example, to automatically form a Web page of the community and offer a forum for an electronic debate, or to offer the mailing list for electronic mail for the community.

The community may be generated automatically or periodically, or it may well be done at the designation of an administrator. Alternatively, these generating aspects for a community may well be combined.

Methods for generating the community include the following to narrow down to a group of workers who:

(1) Are aware of similar knowledge assets
(2) Contribute to the construction of similar knowledge assets
(3) Have similar work styles
(4) Have similar human network tendencies The group of workers may well be further narrowed down by combining the methods (1)–(4).

Furthermore, the group of workers can be narrowed down still further by considering the following items in the above generating method:

(5) Which section of the enterprise each worker belongs to;
(6) What type of job each worker is engaged in;
(7) The degree of knowledge-based management of the section the worker belongs to;
(8) The degree of contribution to knowledge assets by the section; and
(9) Work style tendency of the section That is, the group of workers narrowed down by at least one of the generating methods (1)–(4) may well be further narrowed down by the items (5)–(9), thereby to determine the community members.

Results thus obtained by conducting the survey and the analysis with the data collected from the subjects of the organization and then accumulated may well be maintained stored so as to search for a community by an input designated by a user, or to search for a community based upon a knowledge asset type and a work style category or the like to which a user corresponds, the community consisting of other subjects of, for example, a knowledge asset type and a work style category or the like which are close to those of the user. A repository and a mailing list for the community discovered by the search are generated and are provided to the participants, whereby a community can be meaningfully built within the organization Although the case of conducting the survey and the analysis with the data collected from the subjects of the organization and then accumulated has been explained above, how knowledge work ought to be aided, can be diagnosed for enhancing knowledge assets which are to become important for the whole organization, so as to strategically build a community in accordance with the course of the aid.

Although the case of conducting the survey and the analysis with the data collected from the subjects of the organization and then accumulated has been explained above, the present invention is not restricted to the survey and the analysis for one organization. For example, a survey and an analysis may well be conducted for each of a plurality of organizations, so as to find and compare the correlations between the organizations.

Although an enterprise has been assumed as the organization in this embodiment, the present invention is not restricted to an enterprise. For example, a party or a group in which similar operations or work are performed can be considered to be an organization. In the case of adopting an enterprise as the organization, the result obtained by investigating a plurality of enterprises of the same trade is handled as a population, and differences can be found as to the subject enterprises of the survey. In this case, the tendency of the enterprise (department or group) relative to the other enterprises of the same trade can be easily derived from survey results.

A group of people that gather in a region can also be considered as an organization, to determine its locality, for example.

Furthermore, the same trade or the same operations or work need not always be assumed for the enterprise or the party (group). For example, different categories of business, different operations or the like may well be assumed. The subjects of comparison need not be specifically restricted, and the subjects of comparison may be freely selected for the evaluation of the organization, The processing routines and various functions of this embodiment can be distributed where they are stored on recording media such on magnetic disk media. In this case, when amagnetic disk media read/write device not shown is disposed, the processing routines etc. can be read from and written into the magnetic disk media by the use of the magnetic disk media read/write device. Accordingly, the processing routines etc. may well be recorded in magnetic media disk beforehand so as to run processing programs recorded on the magnetic disk media, through the magnetic disk media read/write device. Alternatively, the processing programs as recorded in the magnetic disk media may well be run by connecting a large-capacity storage device such as hard disk device (not shown) to a computer and storing (installing) these processing programs in the large-capacity storage device. Additionally, the recording media may include a disk such as CD-ROM, MD, MO or DVD, and a magnetic tape such as DAT. When such recording media is used, the required one or ones of a CD-ROM drive, MD drive, MO drive. DVD drive and DAT unit may be employed in place of or in addition to the magnetic disk media read/write device not shown.

As described above, according to the present invention, awareness data which concerns a plurality of subjects in an organization and which expresses feature assets concerning knowledge assets and actions possessed by the respective subjects are collected and accumulated, the accumulated awareness data are analyzed, and analytical results are presented as information regarding the organization. This brings forth the effects that the relations between the knowledge assets of the organization or subjects and the feature assets concerning the actions of the organization or subjects can be analyzed and presented, and that the analytical results of high versatility are not limited only to knowledge that can be derived.

What is claimed is:

1. A knowledge-based management diagnosis device for an organization, comprising:
    an accumulation unit that accumulates awareness data of a plurality of users, wherein the awareness data has knowledge assets and feature assets, the knowledge assets are temporal knowledge assets that indicate how the knowledge assets will change from present to a future time, and the feature assets are related to work styles of the users;
    an analysis unit that analyzes the awareness data accumulated by the accumulation unit; and
    a generating unit that automatically generates a community based on the analyzed awareness data to serve as a platform for knowledge circulation based on knowledge and working manners within an organization.

2. A knowledge-based management diagnosis device according to claim 1, wherein the community represents a place for information circulation or an information community itself.

3. A knowledge-based management diagnosis device according to claim 1, wherein the community is generated automatically based on users who are interested in particular knowledge or users who have similar work styles.

4. A knowledge-based management diagnosis device according to claim 1, wherein the analysis unit analyzes the awareness data based on a characteristic of individual working manner of the user, a characteristic of working manner in an organization, and a characteristic expressive of a source of present and future profit.

5. A knowledge-based management diagnosis device according to claim 1, wherein the analysis unit analyzes the awareness data by selecting two axes, generating a question list to classify the users based on the two axes, and collecting answers, wherein each of the axes has different information.

6. The knowledge-based management diagnosis device according to claim 1, wherein the analysis unit analyzes the awareness data by dividing based on distribution of the awareness data accumulated by the users and classifies the users.

7. A knowledge-based management diagnosis device according to claim 1, wherein the analysis unit analyzes the awareness data based on first awareness data and second awareness data, the first awareness data is inputted by the users and presently important for an organization, and the second awareness data is inputted by the users and will be important for the organization in the future.

8. A knowledge-based management diagnosis device according to claim 1, wherein the awareness data has contribution information that shows present contribution of the user to an organization and the analysis unit further analyzes contribution of the user in the future based on the present contribution.

9. A knowledge-based management diagnosis device according to claim 1, wherein the work styles are analyzed by an autonomy range and an interaction range, the autonomy range extends between routine to creative work, and the interaction range extends between inside office and outside office personal information, and the community is generated based on the work styles.

10. A knowledge-based management diagnosis method for an organization, comprising:
    accumulating awareness data of a plurality of users, wherein the awareness data has knowledge assets and feature assets, the knowledge assets are temporal knowledge assets that indicate how the knowledge assets will change from present to a future time, and the feature assets are related to work styles of the users;
    analyzing the awareness data accumulated; and
    generating a community based on the analyzed awareness data to serve as a platform for knowledge circulation based on knowledge and working manners within an organization.

11. A knowledge-based management diagnosis method according to claim 10, wherein the community represents a place for information circulation or an information community itself.

12. A knowledge-based management diagnosis method according to claim 10, wherein the community is generated automatically based on users who are interested in particular knowledge or users who have similar work styles.

13. A knowledge-based management diagnosis method according to claim 10, wherein the awareness data has knowledge assets and feature assets, the knowledge assets are temporal knowledge assets and the temporal knowledge assets indicate how the knowledge assets will change from present to a future time, and the feature assets are related to work styles of the users.

14. A storage medium readable by a computer, the storage medium storing a program of instructions executable by the computer to perform a function for diagnosing knowledge-based management of an organization, the function comprising:
    accumulating awareness data of a plurality of users, wherein the awareness data has knowledge assets and feature assets, the knowledge assets are temporal knowledge assets that indicate how the knowledge assets will change from present to a future time, and the feature assets are related to work styles of the users;
    analyzing the awareness data accumulated; and
    generating a community based on the analyzed awareness data to serve as a platform for knowledge circulation based on knowledge and working manners within an organization.

15. The storage medium according to claim 14, wherein the community represents a place for information circulation or an information community itself.

16. The storage medium according to claim 14, wherein the community is generated automatically based on users who are interested in particular knowledge or users who have similar work styles.

* * * * *